(12) United States Patent
Traverso et al.

(10) Patent No.: US 12,044,884 B2
(45) Date of Patent: *Jul. 23, 2024

(54) SOLDER REFLOW COMPATIBLE CONNECTIONS BETWEEN OPTICAL COMPONENTS

(71) Applicant: Cisco Technology, Inc., San Jose, CA (US)

(72) Inventors: Matthew J. Traverso, Saratoga, CA (US); Jock T. Bovington, La Mesa, CA (US); Ashley J. M. Erickson, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/653,195

(22) Filed: Mar. 2, 2022

(65) Prior Publication Data
US 2022/0187537 A1 Jun. 16, 2022

Related U.S. Application Data

(63) Continuation of application No. 16/787,632, filed on Feb. 11, 2020, now Pat. No. 11,300,728.

(51) Int. Cl.
*G02B 6/12* (2006.01)
*G02B 6/13* (2006.01)
(Continued)

(52) U.S. Cl.
CPC ........... *G02B 6/13* (2013.01); *G02B 6/12004* (2013.01); *G02B 6/30* (2013.01); *G02B 6/4212* (2013.01)

(58) Field of Classification Search
CPC ..... G02B 6/12004; G02B 6/30; G02B 6/4212
See application file for complete search history.

(56) References Cited

U.S. PATENT DOCUMENTS 5,221,839 A * 6/1993 Braun ................ G02B 13/0095
250/227.24
5,568,579 A * 10/1996 Okaniwa ................ G02B 6/305
385/29

(Continued)

FOREIGN PATENT DOCUMENTS

EP 0194325 B1 * 6/1989
WO WO 2008/040125 A1 * 4/2008

OTHER PUBLICATIONS

Epoxy Technology, EPO-TEK 353ND Technical Data Sheet, revision 28, dated Feb. 2014. retrieved via https://www.thorlabs.com/images/tabimages/353nd_290.pdf (Year: 2014).*

*Primary Examiner* — Michael Stahl
(74) *Attorney, Agent, or Firm* — Patterson + Sheridan, LLP

(57) ABSTRACT

Solder reflow compatible connections between optical components are provided by use of reflow compatible epoxies to bond optical components and remain bonded between the optical components at temperatures of at least 260 degrees Celsius for at least five minutes. In some embodiments, the reflow compatible epoxy is index matched to the optical channels in the optical components and is disposed in the light path therebetween. In some embodiments, a light path is defined between the optical channels through at least a portion of an air gap between the optical components.

17 Claims, 15 Drawing Sheets

(51) Int. Cl.
*G02B 6/30* (2006.01)
*G02B 6/42* (2006.01)

(56) References Cited

U.S. PATENT DOCUMENTS

| | | | | |
|---|---|---|---|---|
| 5,684,902 | A * | 11/1997 | Tada | H01S 5/02326 385/88 |
| 6,148,126 | A * | 11/2000 | Zheng | G02B 6/32 385/33 |
| 6,751,395 | B1 * | 6/2004 | Novotny | G02B 6/3588 385/39 |
| 6,834,133 | B1 * | 12/2004 | Towle | G02B 6/4232 385/94 |
| 11,300,728 | B2 * | 4/2022 | Traverso | G02B 6/4212 |
| 2003/0185517 | A1 * | 10/2003 | Kobayashi | G02B 6/241 385/50 |
| 2004/0105651 | A1 * | 6/2004 | Chen | G02B 6/353 385/140 |
| 2004/0136680 | A1 * | 7/2004 | Medina | G02B 6/358 385/140 |
| 2006/0093002 | A1 * | 5/2006 | Park | H01S 5/0236 372/50.1 |
| 2008/0056073 | A1 * | 3/2008 | Shimizu | G11B 5/314 |
| 2010/0079635 | A1 * | 4/2010 | Yano | G02B 3/0062 359/503 |
| 2010/0220957 | A1 * | 9/2010 | Asahi | G02B 6/4239 385/39 |
| 2013/0279312 | A1 * | 10/2013 | Hurley | G11B 5/6088 156/60 |
| 2015/0036984 | A1 * | 2/2015 | Wang | G02B 6/423 385/88 |
| 2015/0355409 | A1 * | 12/2015 | Yanagisawa | G02B 6/4224 385/14 |
| 2015/0378095 | A1 * | 12/2015 | Hsu | H01L 31/167 438/24 |
| 2016/0154189 | A1 * | 6/2016 | Elliott | G02B 6/325 156/60 |

* cited by examiner

SOLDER REFLOW COMPATIBLE CONNECTIONS BETWEEN OPTICAL COMPONENTS

CROSS-REFERENCE TO RELATED APPLICATIONS

This application is a continuation of co-pending U.S. patent application Ser. No. 16/787,632 filed Feb. 11, 2020. The aforementioned related patent application is herein incorporated by reference in its entirety.

TECHNICAL FIELD

Embodiments presented in this disclosure generally relate to optical devices and the manufacture thereof. More particularly, the present disclosure provides for reflow resilient optical devices that may be connected together in a photonic die and later subjected to the temperatures used during solder reflow processes to form solder bonds.

BACKGROUND

When connecting one optical component to another component, the optical components are often attached at the end of the manufacturing process due to the high temperatures used in the earlier steps, such as solder reflow, which may damage the optical components or connections between the optical components. For example, the temperatures used during solder reflow can potentially melt, misalign, or damage optical components. By limiting when an optical component can be mounted to an electrical component or another optical component, the architectures of opto-electronic devices or optical devices are also constrained.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
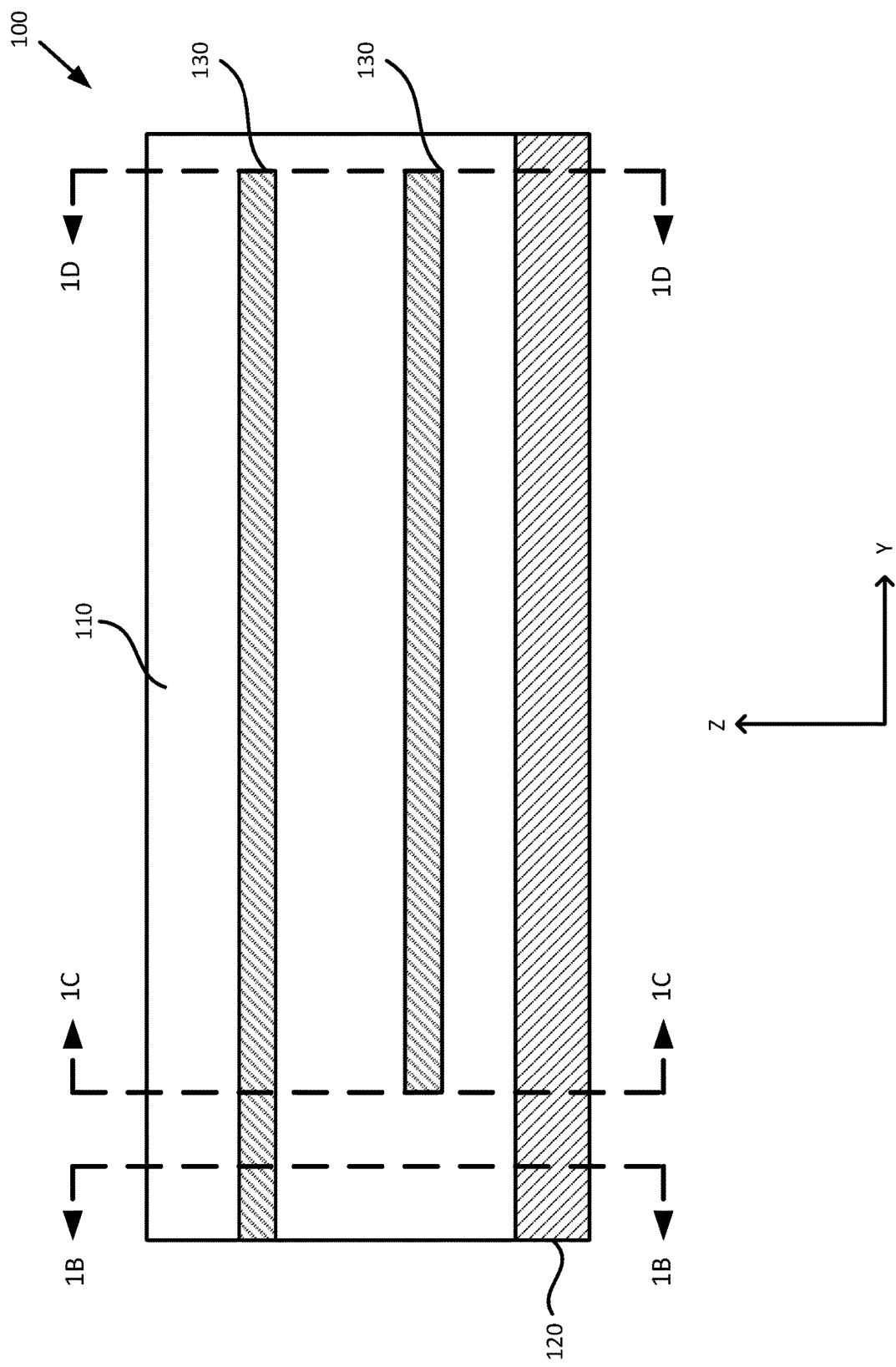
FIGS. 1A-1F illustrate various optical channels as may be used in the optical devices described in the present disclosure.

One embodiment presented in this disclosure is a device, comprising: a first optical component that includes a first optical channel defined at a first height relative to a reference plane and that terminates at a first interface surface of the first optical component; and a second optical component that includes a second optical channel defined at a second height, different from the first height, relative to the reference plane and that terminates at a second interface surface of the second optical component; wherein an air gap is defined between the first interface surface and the second interface surface; wherein a light path is defined between the first optical channel and the second optical channel across at least a portion of the air gap; and wherein the first optical component is bonded, via a solder bond, to the second optical component.

One embodiment presented in this disclosure is a device, comprising: a first optical component that includes a first optical channel; a second optical component that includes a second optical channel aligned with the first optical channel to define a light path running between the first optical component and the second optical component, wherein a gap is defined between the first optical component and the second optical component through which the light path travels; and an epoxy that bonds the first optical component with the second optical component, wherein the epoxy is disposed in the light path between the first optical channel and the second optical channel and is index matched to the first optical channel and the second optical channel, and wherein the epoxy is reflow compatible to remain stable and bond the first optical component with the second optical component at temperatures of at least 260 degrees Celsius for at least five minutes.

One embodiment presented in this disclosure is a method, comprising: positioning a first optical component relative to a second optical component to define a gap between a first optical channel included in the first optical component and a second optical channel included in the second optical component; and applying a reflow compatible epoxy in at least a portion of the gap between the first optical channel and the second optical channel, wherein the reflow compatible epoxy is index matched to define a light path between the first optical channel and the second optical channel and is configured to remain bonded between the first optical component and the second optical component at temperatures of at least 260 degrees Celsius.

Example Embodiments

The present disclosure provides for reflow compatible approaches in connecting photonic dies together. In some embodiments (e.g., using vertically alignable components) the reflow compatible approaches allow photonic elements to be connected earlier in the fabrication process than previous approaches and at the wafer level (rather than the component level), thus improving the ease and speed of manufacture of combined opto-electronic devices. In some embodiments, the optical device and the electrical device are included in a shared reconstituted wafer, and the optical device is subjected to any temperatures or pressures used in the processes performed on the electrical device (e.g., solder reflow), and the optical device is therefore constructed to withstand those temperatures and pressure.

When an epoxy is selected to bond two optical devices together or an optical device with an electrical device (or the respective components thereof), the epoxy may be selected for the refractive index thereof (i.e., an index matched epoxy), so that light passing from one optical device to another through the epoxy suffers minimal refraction or distortion. However, depending on the epoxy selected, the epoxy may run the risk of changing optical properties or melting away under the temperatures used for solder reflow (e.g., approximately 260 degrees Celsius), thus potentially disconnecting, misaligning, or otherwise damaging one or more of the optical components. As used herein, the optical components include various silicon chips, laser patterned glass parts, or other materials in which at least one optical channel is defined to carry optical signals. As used herein, an epoxy or other material referred to as "reflow compatible" is one that is stable (i.e., does not deform, denature, un-bond, or otherwise change material properties) at the temperatures used during solder reflow (e.g., up to 260 degrees Celsius) for at least five minutes. Accordingly, the various embodiments described herein provide for various improvements in manufacture of opto-electronic devices.

Figure 1B:
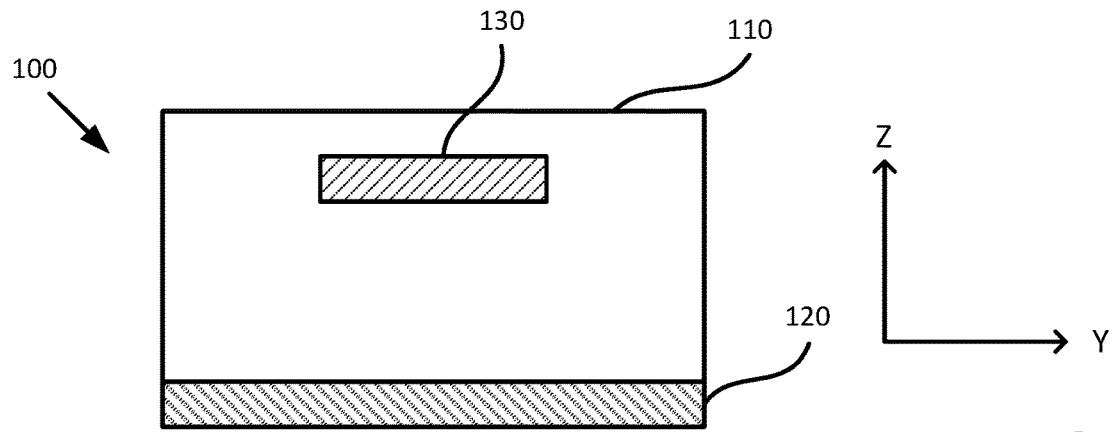
Figure 1C:
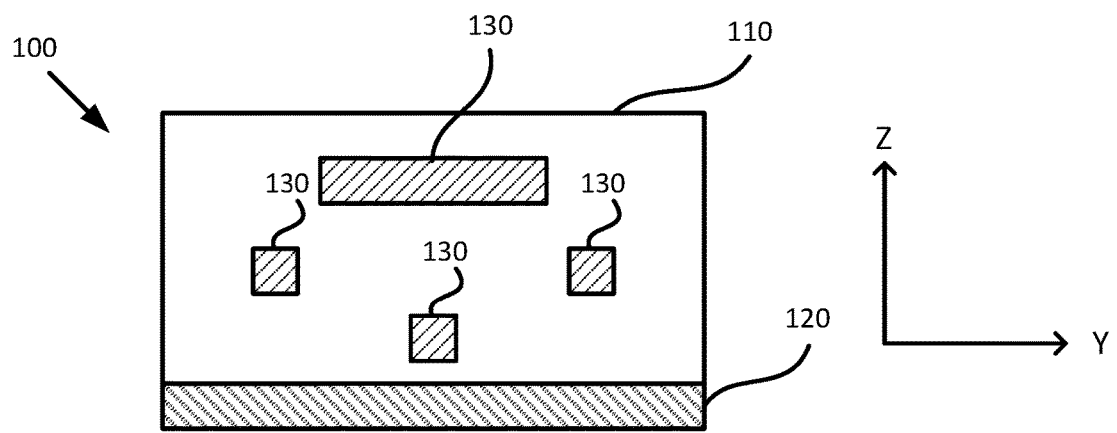
Figure 1D:
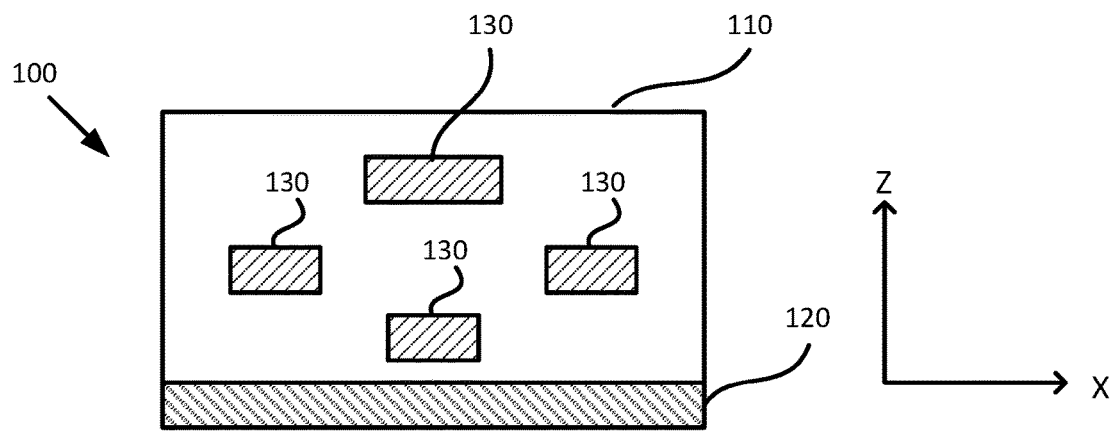
Figure 1E:
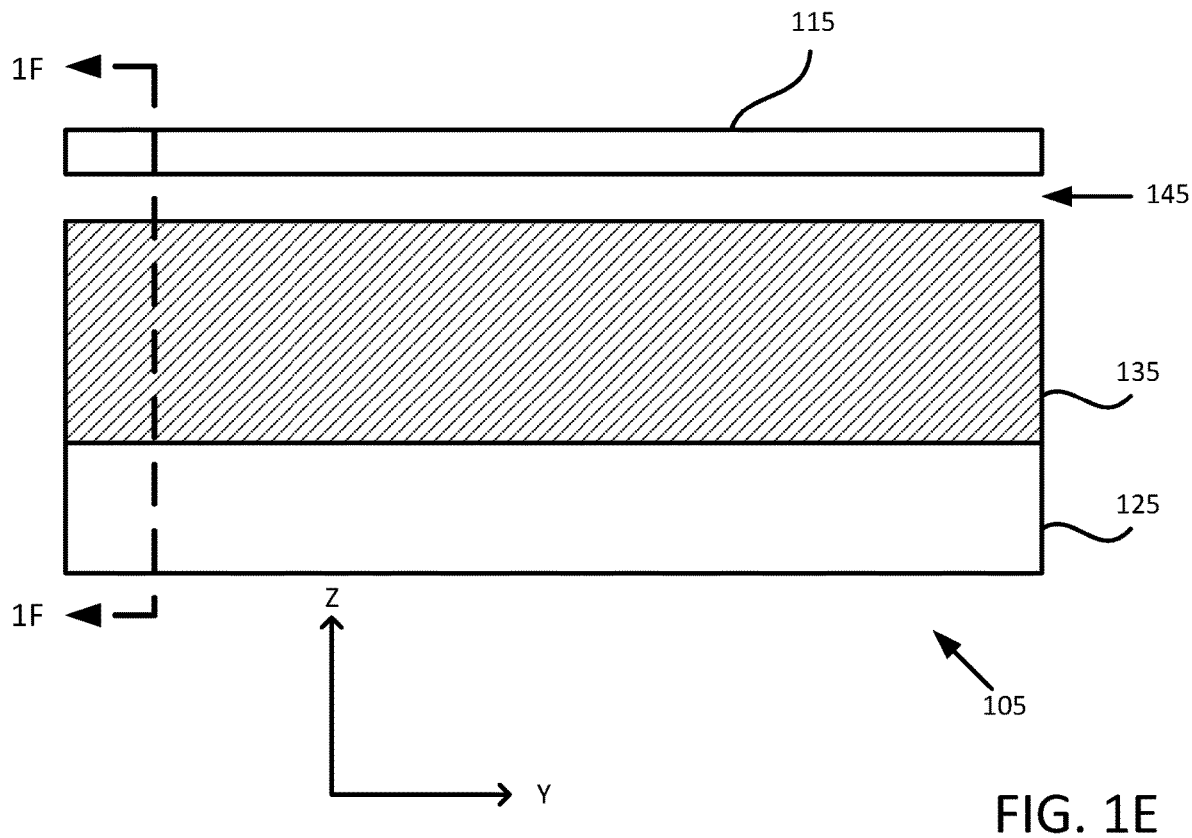
Figure 1F:
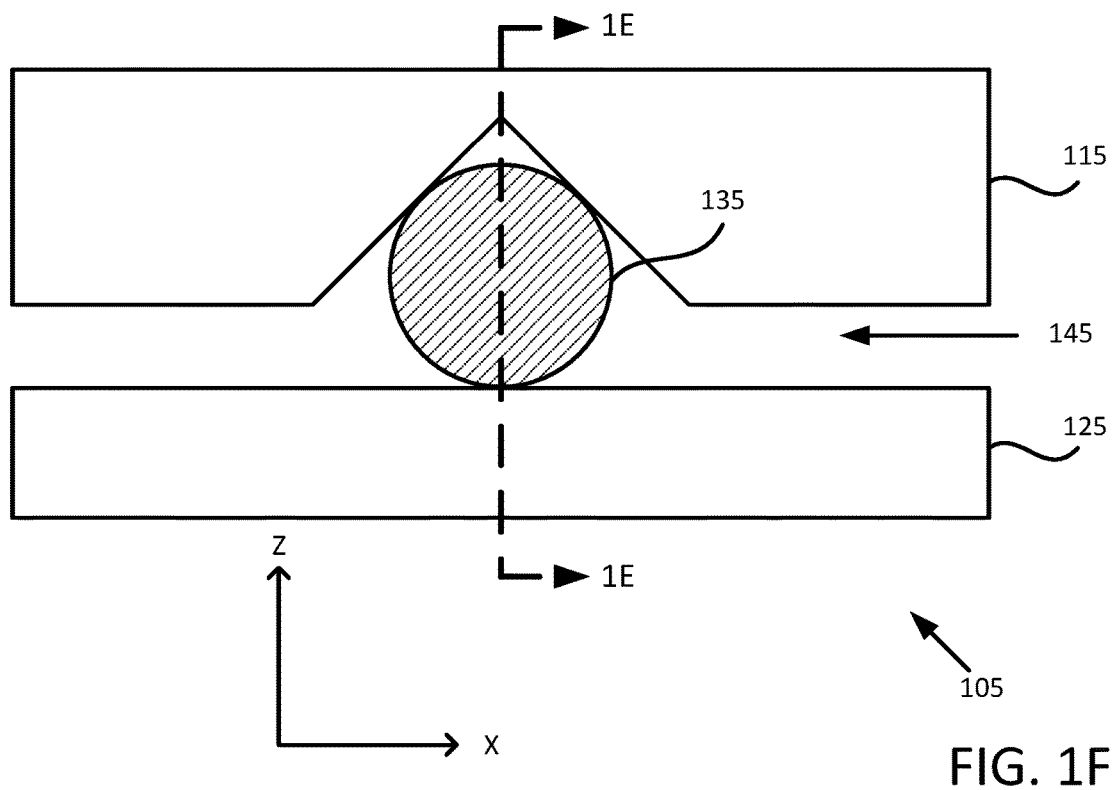

FIGS. 1A-1F illustrate various optical channels as may be used in the optical devices described in the present disclosure. FIGS. 1A-1D illustrate a prong coupler 100, and FIGS. 1E and 1F illustrate an optical fiber cable assembly 105. In various embodiments, two optical devices are connected to one another to define an optical platform or optical engine. As used herein, the term "optical channel" includes at least one of a silicon-on-insulator, silicon nitride, or other material of photonic waveguide 130 (generally, waveguide 130) and an optical fiber 135. The two optical devices may each include a mixture of prong couplers 100 and/or optical fiber cable assemblies 105, (e.g., two linked optical fiber cable assemblies 105, two linked prong couplers 100, one prong coupler 100 linked with one optical fiber cable assembly 105), and the size, shape, and orientation of the optical channels are provided in the Figures of the present disclosure as non-limiting examples of how two optical channels may be linked to one another.

FIG. 1A illustrates a cross-sectional view of a prong coupler 100 in a first plane (e.g., the Z-Y plane), according to embodiments of the present disclosure. A prong coupler 100 allows light entering or exiting an optical component to mimic a single mode fiber (i.e., have the same mode size and beam properties), without the need of lenses or additional optics to change the properties of the light. The prong coupler 100 described herein represents one arrangement of waveguides 130 that can be used in the present disclosure, as the present disclosure contemplates various arrangements of waveguides 130 defined in a solid medium. The prong coupler 100 is defined in a core, such as a $SiO_2$ or another dielectric, which is grown from or bonded to a substrate 120, such as a Si or GaAs wafer.

FIGS. 1B-1D illustrate cross-sectional views of the prong coupler 100 in a perpendicular plane to FIG. 1A (e.g., the Z-X plane), highlighting that the prong coupler 100 includes several waveguides 130 that vary in number, size, and shapes at different points along the length of the prong coupler 100. The waveguides 130 may be made from silicon nitride ($Si_3N_4$) or similar materials that can withstand the temperatures used during solder reflow (e.g., up to 260 degrees Celsius for up to five minutes) without melting, deforming, or otherwise undergoing a change in the properties of the material. Additionally, active optical components (e.g., lasers, photodiodes, etc.) and electrical traces may also be formed within the material matrix relative to the waveguides 130 to form an active Photonic Integrated Circuit (PIC), although the prong coupler 100 may also be defined independently of electrical components to form a Passive Optical Device (POD).

FIG. 1E illustrates a first cross-sectional view of an optical fiber cable assembly 105 in a first plane (e.g., the Z-Y plane) and FIG. 1F illustrates a second cross-sectional view of the optical fiber cable assembly 105 in a second plane (e.g., the Z-X plane), according to embodiments of the present disclosure. An optical fiber cable assembly 105 allows an optical fiber 135 to be secured in a given location, and can secure several such optical fibers 135 in one physical component quickly and with high positional reliability relative to one another. In some embodiments, a base 115 and a lid 125 secure the optical fiber 135 in place between one another (e.g., in a v-groove or other physical channel) and are secured to each other via an epoxy. In various embodiments, the epoxy is applied to fill some or all of a gap 145 defined between the base 115 and the lid 125 to bond the base 115 and the lid 125 together, and capture the optical fibers 135 therebetween.

The base 115, lid 125, and optical fibers 135 may be constructed from various glasses or plastics with various optical properties. For example, the optical fibers 135 are transmissive to various wavelengths of light, while the base 115 and/or lid 125 can reflect those wavelengths or otherwise be less transmissive than the optical fibers 135.

Figure 2A:
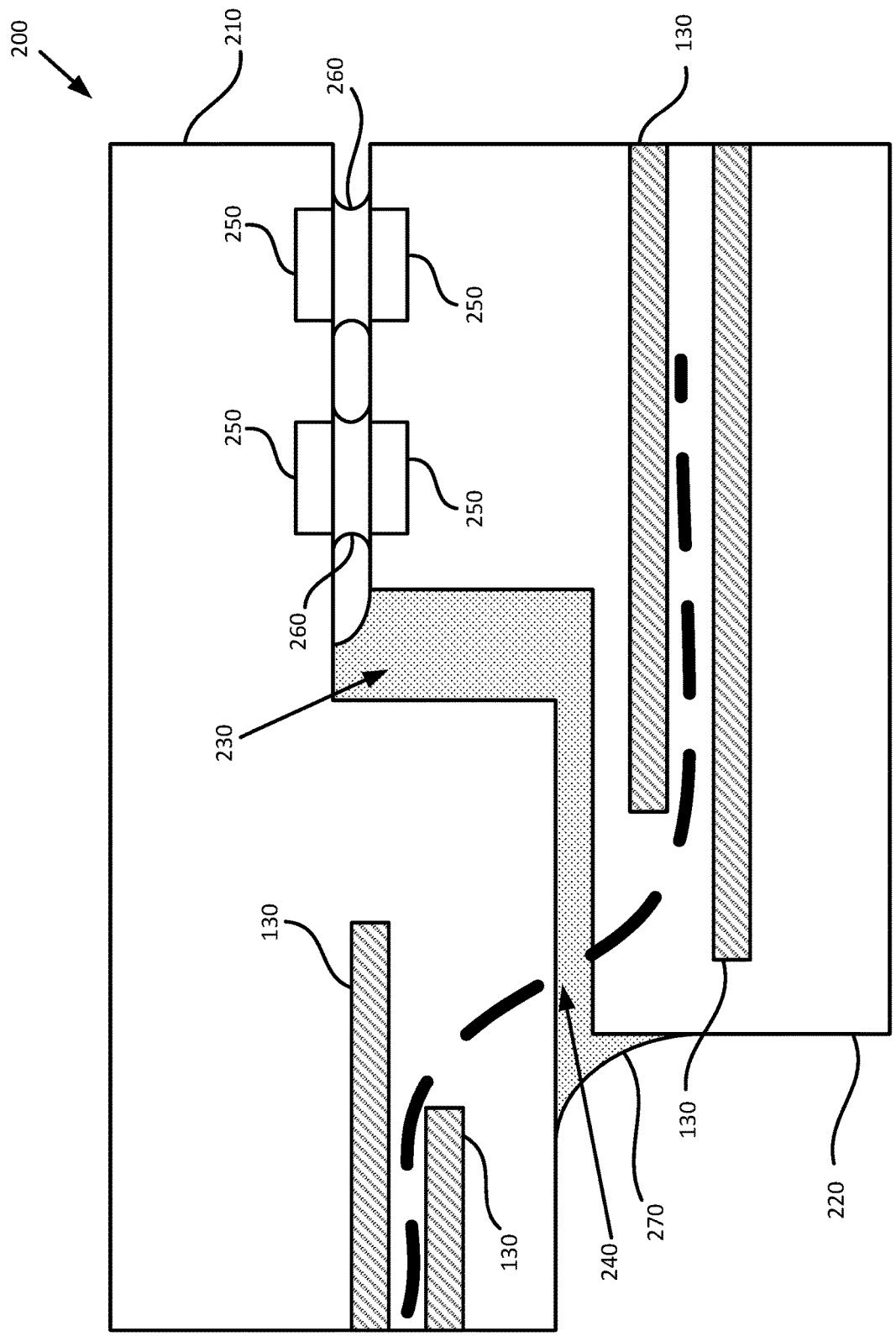
FIGS. 2A and 2B illustrate cross-sectional views of an evanescent joint in an optical assembly, according to embodiments of the present disclosure.
Figure 2B:
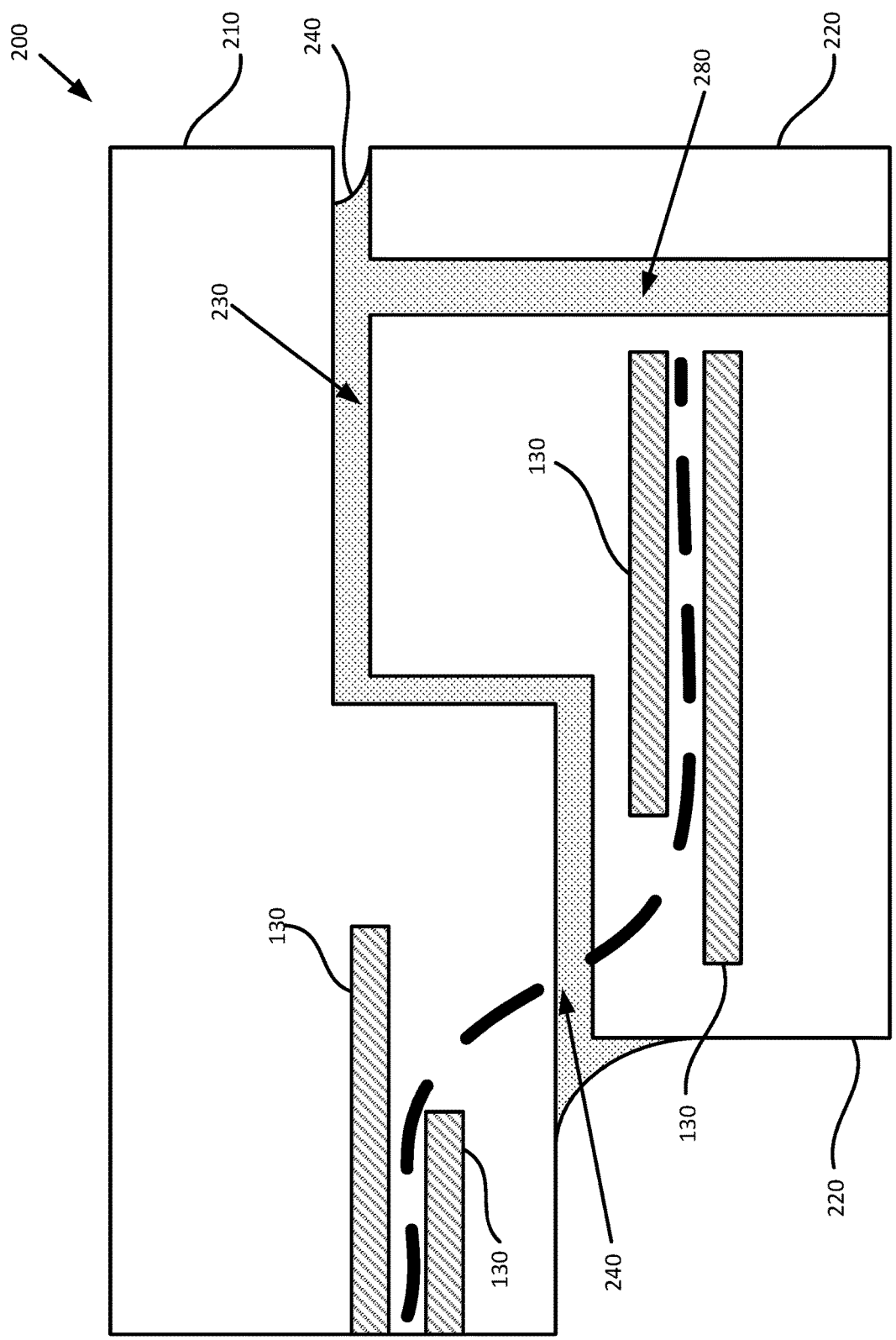
Figure 3A:
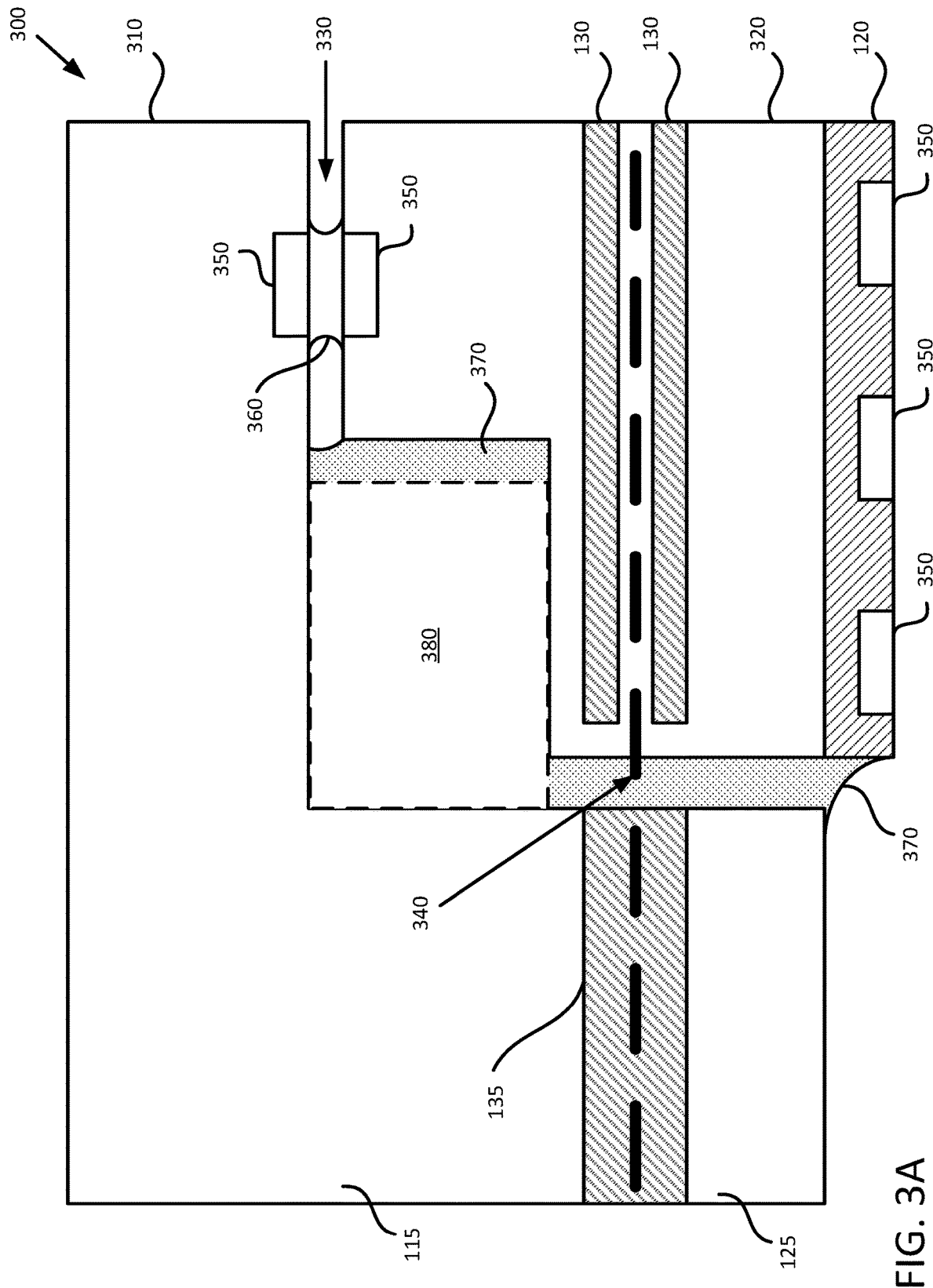
FIGS. 3A and 3B illustrate cross-sectional views of an abutting joint in an optical assembly, according to embodiments of the present disclosure.
Figure 3B:
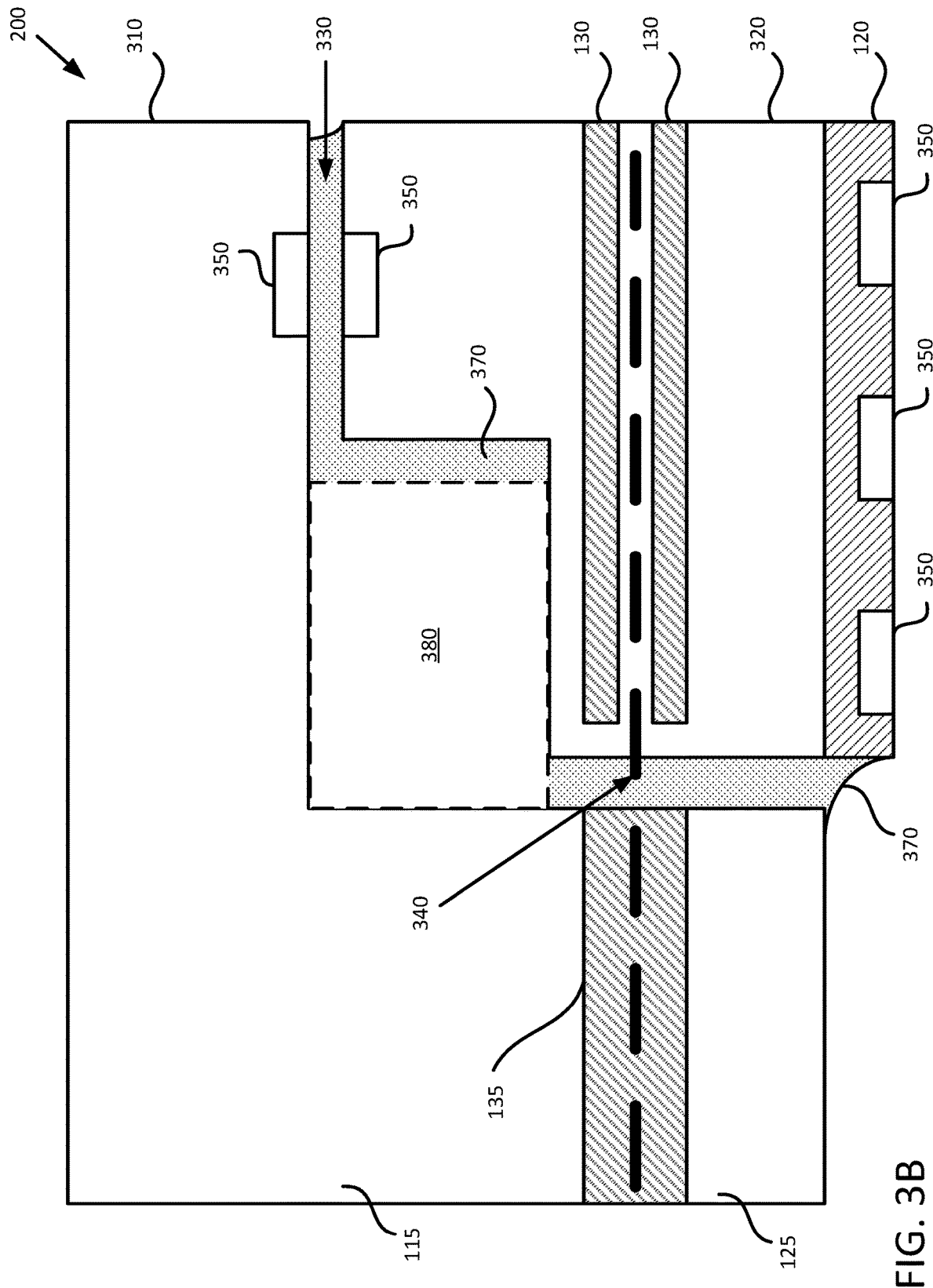

Depending on the geometries and arrangements of the optical channels, the transfer of light may be achieved via an evanescent transfer to a transverse plane of propagation, such as in FIGS. 2A and 2B, or via a facing or abutting joint (also referred to as a "butt-joint") such as in FIGS. 3A and 3B.

FIGS. 2A and 2B illustrate cross-sectional views 200 of an evanescent joint in an optical assembly, according to embodiments of the present disclosure. In FIG. 2A, a first optical component 210 and a second optical component 220 are shown bonded together via a joint including solder bonds and an epoxy bond, whereas in FIG. 2B, the first optical component 210 and the second optical component 220 are shown bonded together via a joint including an epoxy bond. The bonds may occupy some or all of a gap 230 defined between the first optical component 210 and the second optical component 220, and may vary across the optical assembly at different cross-sections thereof. The waveguides 130 of the first optical component 210 are aligned relative to the waveguides 130 of the second optical component 220 to define a light path 240 running from a first plane in the first optical component 210 to a second plane on the second optical component 220, which may direct light into or out of the first optical component 210 to/from the second optical component 220.

Although not illustrated, one or more of the first optical component 210 and the second optical component 220 may be bonded to or grown from (and remain attached to) a substrate, such as a Si wafer. In some embodiments, one or more of the first optical component 210 and the second optical component 220 may be encased in a mold compound to form part of a reconstituted die. In various embodiments, the substrate 120 may include one or more solder pads that are available to bond the substrate 120 to an external device, such as an electrical integrated circuit, via a solder bond that can physically connect the optical component to the external device and/or electrically connect the external device to an electrical component defined in the optical component.

In various embodiments, the gap 230 defined between the first optical component 210 and the second optical component 220 is defined by one or more spacers (not illustrated in the current cross-sectional views) that position the first optical component 210 at a predefined distance from the second optical component 220. The spacers provide a vertical reference to define the gap 230, and may also include various features to interlock or provide for bonding between the optical components. In various embodiments, the spacers may include various alignment features, such as those described in greater detail in regard to FIGS. 6A-6C and 7A-7C. In various embodiments, one or both of the first optical component 210 and the second optical component 220 may include spacers to engage with the opposite optical component, or the spacers may be a separate component (e.g., a glass block) placed between first optical component 210 and the second optical component 220.

A solder bond can be formed between the first optical component 210 and the second optical component 220 via solder pads 250 or other connection points on the optical components and a solder bead 260. By subjecting the solder bead 260 to sufficient temperature, and then cooling the solder bead 260, the solder bead 260 melts and re-solidifies; soldering the solder pads 250 to one another. In various embodiments, the solder joint both physically secures the first optical component 210 and the second optical component 220 and electrically couples a trace or electrical component in the first optical component 210 to a trace or electrical component in the second optical component 220.

In various embodiments, the epoxy bond may be formed before or after the solder bond is formed (or be omitted). When the epoxy bond is formed before the solder bond, a high-temperature index matched epoxy 270 (generally, epoxy 270) is selected so that the epoxy 270 does not melt, deform, or denature during the soldering process. Other reflow compatible epoxies that are stable and retain the bond between optical components at temperatures of at least 260 degrees Celsius for at least five minutes may also be used (e.g., so that the mechanical connection made via the epoxy bond survives solder reflow of the assembled devices or when the combined assembly is integrated into subsequent devices/assemblies/modules/systems. In some embodiments, the solder bond is omitted, and only an epoxy bond is applied, although the selected epoxy 270 may also be a high-temperature index matched epoxy, to allow for solder reflow with other components not illustrated in the current Figures.

In FIGS. 2A and 2B, the epoxy 270 occupies a portion of the gap 230 between the waveguides 130 of the first optical component 210 and the waveguides 130 of the second optical component 220, although various prong couplers 100 and optical fiber cable assemblies 105 may be used in various embodiments. Because the epoxy 270 is index matched to the material of the optical components, signals carried over the light path 240 travel through the gap 230 (via the epoxy 270) as though through the material of the optical components. In various embodiments, the surfaces of the first optical component 210 and the second optical component 220 may be treated with various mechanical processes or chemical process (e.g., smoothing, anti-reflective coatings) to further aid transmission of light from one optical component to another.

In some embodiments, such as is illustrated in FIG. 2B, the second optical component 220 defines an etched trench 280 that a fabricator may define to various depths, and to run various lengths (e.g., into or out of the page) to provide for additional mechanical support when the epoxy 270 if deposited therein.

In some embodiments, FIG. 2B illustrates an embodiment in which a solder bond is not present in the visible cross-section, but is included in the optical assembly at a non-illustrated location. In other embodiments, FIG. 2B illustrates an embodiment in which a solder bond is not used in the optical assembly, and instead the epoxy deposited in the gap 230 bonds the first optical component 210 to the second optical component 220.

FIGS. 3A and 3B illustrate cross-sectional views 300 of an abutting joint in an optical assembly, according to embodiments of the present disclosure. In FIG. 3A, a first optical component 310 and a second optical component 320 are shown bonded together via a joint including solder bonds and an epoxy bond, whereas in FIG. 3B, the first optical component 310 and the second optical component 320 are shown bonded together via a joint including an epoxy bond. The bonds may occupy some or all of a gap 330 defined between the first optical component 310 and the second optical component 320, and may vary across the optical assembly at different cross-sections thereof. The optical fiber 135 of the first optical component 310 is aligned relative to the waveguides 130 of the second optical component 320 to define a light path 340 running from the first optical component 310 to the second optical component 320 along a straight path, which may direct light into or out of the first optical component 310 to/from the second optical component 320.

In various embodiments, one or more of the first optical component 310 and the second optical component 320 may be bonded to or grown from (and remain attached to) a substrate 120, such as a Si or GaAs wafer. In some embodiments, one or more of the first optical component 310 and the second optical component 320 may be encased in a mold compound to form part of a reconstituted die. In various embodiments, the substrate 120 may include one or more solder pads 350 that are available to bond the substrate 120 to an external device, such as an electrical integrated circuit, via a solder bond that can physically connect the optical component to the external device and/or electrically connect the external device to an electrical component defined in the optical component.

In various embodiments, the gap 330 defined between the first optical component 310 and the second optical component 320 is defined by one or more spacers 380 that position the first optical component 310 at a predefined distance from the second optical component 320. The spacers 380 provide a vertical reference to define the gap 330, and may also include various features in various embodiments to interlock or provide for bonding between the optical components. In various embodiments, the optical components and spacers 380 may include various alignment features, such as those described in greater detail in regard to FIGS. 6A-6C and 7A-7C to align the optical components horizontally with one another. In various embodiments, one or both of the first optical component 310 and the second optical component 320 may include spacers 380 to engage with the opposite optical component, or the spacers 380 may be a separate component (e.g., a glass block) placed between first optical component 310 and the second optical component 320.

In various embodiments, the gap 330 defined between the first optical component 310 and the second optical component 320 is defined by one or more spacers 380 that position the first optical component 310 at a predefined distance from the second optical component 320. In various embodiments, the spacers 380 may include various alignment features, such as those described in greater detail in regard to FIGS. 6A-6C and 7A-7C. In various embodiments, one or both of the first optical component 310 and the second optical component 320 may include spacers 380 to engage with the opposite optical component.

A solder bond can be formed between the first optical component 310 and the second optical component 320 via solder pads 350 or other connection points on the optical components and a solder bead 360. By subjecting the solder bead 360 to sufficient temperature, and then cooling the solder bead 360, the solder bead 360 melts and re-solidifies; soldering the solder pads 350 to one another. In various embodiments, the solder joint both physically secures the first optical component 310 and the second optical component 320 and electrically couples a trace or electrical component in the first optical component 310 to a trace or electrical component in the second optical component 320.

In various embodiments, the epoxy bond may be formed before or after the solder bond is formed, or may be formed and the solder bond omitted. When the epoxy bond is formed before or to omit the solder bond, a high-temperature index matched epoxy 370 (generally, epoxy 370) is selected so that the epoxy 370 does not melt, deform, or denature during the soldering process. Other reflow compatible epoxies that are stable and retain the bond between optical components at temperatures of at least 260 degrees Celsius for at least five minute may also be used. In some embodiments, the solder bond is omitted, and only an epoxy bond is applied, although the selected epoxy 370 may also be a high-temperature index matched epoxy, to allow for solder reflow with other components not illustrated in the current Figures.

In components using an optical fiber cable assembly 105, such as the first optical component 310 in FIGS. 3A and 3B, the epoxy used to bond the lid 125 to the base 115 and secure the optical fiber 135 therein may use the same epoxy 270 used in the gap 330, or may use a high temperature epoxy that is capable of withstanding the soldering process, but is not necessarily index matched.

In FIGS. 3A and 3B, the epoxy 370 occupies a portion of the gap 330 between the optical fibers 135 of the first optical component 310 and the waveguides 130 of the second optical component 320, although various prong couplers 100 and optical fiber cable assemblies 105 may be used in various embodiments. Because the epoxy 370 is index matched to the material of the optical components, signals carried over the light path 340 travel through the gap 330 (via the epoxy 370) as though through the material of the optical components. In various embodiments, the surfaces of the first optical component 310 and the second optical component 320 may be treated with various mechanical processes or chemical process (e.g., smoothing, plasma treatment, anti-reflective coatings) to further aid transmission of light from one optical component to another.

In some embodiments, FIG. 3B illustrates an embodiment in which a solder bond is not present in the visible cross-section, but is included in the optical assembly at a non-illustrated location. In other embodiments, FIG. 3B illustrates an embodiment in which a solder bond is not used in the optical assembly, and instead the epoxy deposited in the gap 330 bonds the first optical component 310 to the second optical component 320.

Figure 4A:
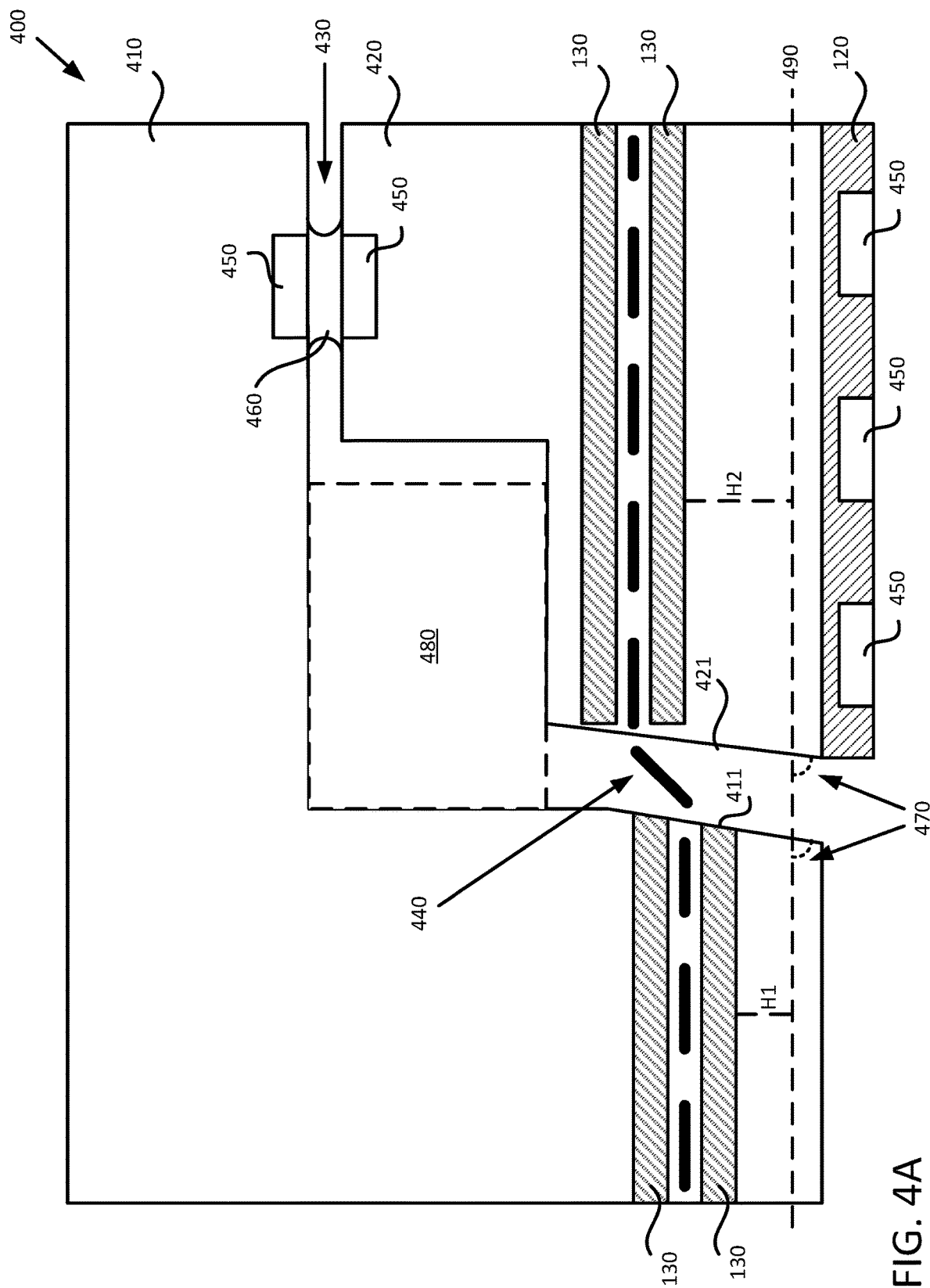
FIGS. 4A and 4B illustrate cross-sectional views of an open joint in an optical assembly, according to embodiments of the present disclosure.
Figure 4B:
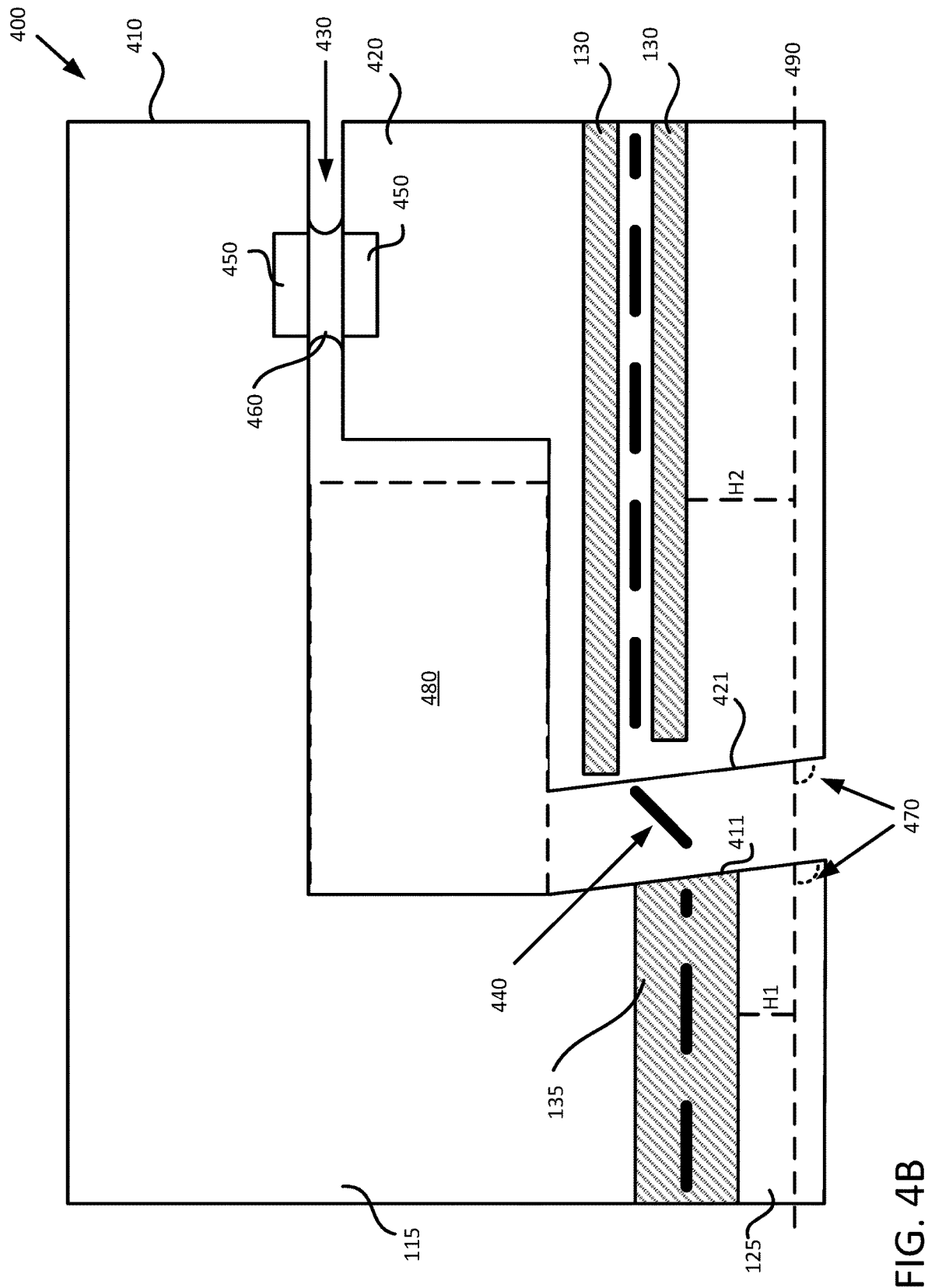

FIGS. 4A and 4B illustrate cross-sectional views 400 of an open joint in an optical assembly, according to embodiments of the present disclosure. In FIGS. 4A and 4B, a first optical component 410 and a second optical component 420 are shown bonded together via a solder joint and no epoxy, with a gap 430 remaining between the respective optical channels. When the gap 430 is not filled with an epoxy, the gap 430 is referred to herein as an "air gap," although an air gap 430 may be filled with air, another gas (e.g., $N_2$), or vacuum. The solder joint occupies some of the air gap 430 defined between the first optical component 410 and the second optical component 420, and may vary in cross-sectional area across the optical assembly at different cross-sections thereof. The optical channels of the first optical component 410 are aligned relative to the optical channels of the second optical component 420 and a refractive difference of the air present in the air gap 430 to define a light path 440 running from the first optical component 410 to the second optical component 420, which may direct light into or out of the first optical component 410 to/from the second optical component 420.

In various embodiments, one or more of the first optical component 410 and the second optical component 420 may be bonded to or grown from (and remain attached to) a substrate 120, such as a Si or GaAs wafer, or may be grown from a substrate, which is later removed. In some embodiments, one or more of the first optical component 410 and the second optical component 420 may be encased in a mold compound to form part of a reconstituted die. In various embodiments, the substrate 120 may include one or more solder pads 450 that are available to bond the substrate 120 to an external device, such as an electrical integrated circuit, via a solder bond that can physically connect the optical component to the external device and/or electrically connect the external device to an electrical component defined in the optical component.

In various embodiments, the air gap 430 defined between the first optical component 410 and the second optical component 420 is defined by one or more spacers 480 that position the first optical component 410 at a predefined distance from the second optical component 420. The spacers 480 provide a vertical reference to define the air gap 430, and may also include various features in various embodiments to interlock or provide for bonding between the optical components. In various embodiments, the optical components and spacers 480 may include various alignment features, such as those described in greater detail in regard to FIGS. 6A-6C and 7A-7C to align the optical components horizontally with one another. In various embodiments, one or both of the first optical component 410 and the second optical component 420 may include spacers 480 to engage with the opposite optical component, or the spacer 480 may be a separate component (e.g., a glass block) placed between first optical component 410 and the second optical component 420.

A solder bond can be formed between the first optical component 410 and the second optical component 420 via solder pads 450 or other connection points on the optical components and a solder bead 460. By subjecting the solder bead 460 to sufficient temperature, and then cooling the solder bead 460, the solder bead 460 melts and re-solidifies; soldering the solder pads 450 to one another. In various embodiments, the solder joint both physically secures the first optical component 410 and the second optical component 420 and electrically couples a trace or electrical component in the first optical component 410 to a trace or electrical component in the second optical component 420.

In various embodiments, the epoxy bond may be formed before or after the solder bond is formed. When the epoxy bond is formed before the solder bond, a high-temperature index matched epoxy 370 (generally, epoxy 370) is selected so that the epoxy 370 does not melt, deform, or denature during the soldering process. Other reflow compatible epoxies that are stable and retain the bond between optical components at temperatures of at least 260 degrees Celsius for at least five minute may also be used. In some embodiments, the solder bond is omitted, and only an epoxy bond is applied, although the selected epoxy 370 may also be a high-temperature index matched epoxy, to allow for solder reflow with other components not illustrated in the current Figures.

In components using a cable assembly, such as the first optical component 410 in FIGS. 4B, the epoxy used to bond the lid 125 to the base 115 and secure the optical fiber 135 therein uses a high temperature epoxy that is capable of withstanding the soldering process, but is not necessarily index matched to the materials of the optical components or the optical channels.

Because an open joint does not include an index matched epoxy between the optical channels, the light path 440 travels between the first optical component 410 and the second optical component 420 through the medium filling the air gap 430 (e.g., air or another gas set by the fabricator during fabrication of the optical assembly. Accordingly, between a first interface surface 411 of the first optical component 410 and a second interface surface 421 of the second optical component 420, the light path 440 refracts according to the indices of refraction of the various materials through which the light path 440 travels; angling the light path 440.

To account for the angling of the light path 440, the optical channels are positioned at different heights relative to a reference plane 490 (e.g., H1 and H2, respectively) and the first interface surface 411 and second interface surface 421 are defined to share a slope 470 relative to the reference plane 490. FIG. 4A illustrates an acute slope 470, where the slope 470 is less than perpendicular to the reference plane 490, and FIG. 4B illustrates an obtuse slope 470, where the slope 470 is more than perpendicular to the reference plane 490. In various embodiments, the slope 470 is ten degrees or less from perpendicular relative to the reference plane 490 (e.g., 90 degrees±10 degrees), which may vary based on the relative indices of refraction in the open joint. In various embodiments, the slope 470 is approximately the same (e.g., ±1 degree) for each of the first interface surface 411 and the second interface surface 421.

In various embodiments, the fabricator may include various surface treatments or optical components (e.g., lenses) that also affect the indices of refraction and the angle of the direction of travel of the light path 440 between the optical components, which the incident angle of the slope 470 accounts for.

Figure 5A:
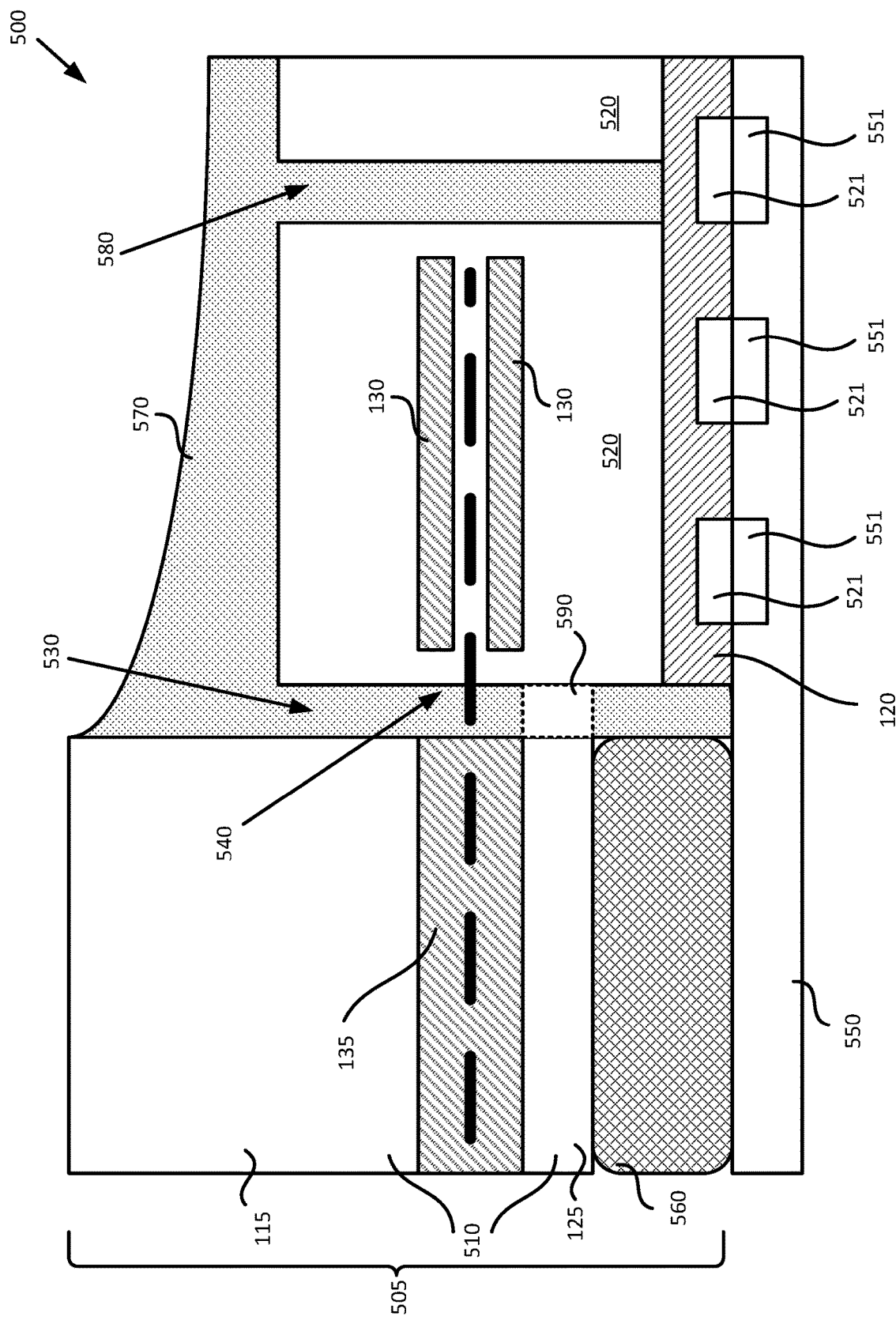
FIG. 5A illustrates a cross-sectional view of an abutting joint formed without an overhang between the first optical component and the second optical component, according to embodiments of the present disclosure.

FIG. 5A illustrates a cross-sectional view 500 of an abutting joint formed without an overhang between the first optical component 510 and the second optical component 520, according to embodiments of the present disclosure. In FIG. 5A, a first optical component 510 and a second optical component 520 are shown bonded together to a shared platform 550 via a joint including an epoxy bond and not including (or omitting) a solder bond. The epoxy bond may occupy some or all of a gap 530 defined between the first optical component 510 and the second optical component 520, and may encapsulate the second optical component 520 in some embodiments. The optical channels of the first optical component 510 are aligned relative to the optical channels of the second optical component 520 to define a light path 540 running from the first optical component 510 to the second optical component 520 along a straight (e.g., linear) path, which may direct light into or out of the first optical component 510 to/from the second optical component 520.

As illustrated, one or more of the first optical component 510 and the second optical component 520 may be bonded to or grown from (and remain attached to) a substrate 120, such as a Si or GaAs wafer, which is bonded to the shared platform 550. In some embodiments, one or more of the first optical component 210 and the second optical component 220 may be encased in a mold compound (or the epoxy 570 acting as such) to form part of a reconstituted die. As shown, the second optical component 520 includes by several solder pads 521 bonded via solder joint formed with corresponding solder pads 551 of the shared platform 550, which may physically and/or electrically connect the second optical component 520 with the shared platform 550. In various embodiments, the solder joints are formed after the first optical component 510 and the second optical component 520 are secured to one another via the epoxy 570.

In various embodiments, the shared platform 550 may include a printed circuit board or other Electrical Integrate Circuit (EIC) that electrically interfaces with one or more of the first optical component 510 and the second optical component 520. The shared platform 550 may be bonded directly to the optical components via solder bonds (e.g., to one or more through Silicon vias defined through a substrate 120), or the optical components may be held directly or indirectly in place with the shared platform 550 via an epoxy 570. For example, an epoxy bond can hold the first optical component 510 to the shared platform 550, or epoxy bonds can hold a stabilizer 560 to the shared platform 550 and the first optical component 510 to the stabilizer 560.

Figure 5B:
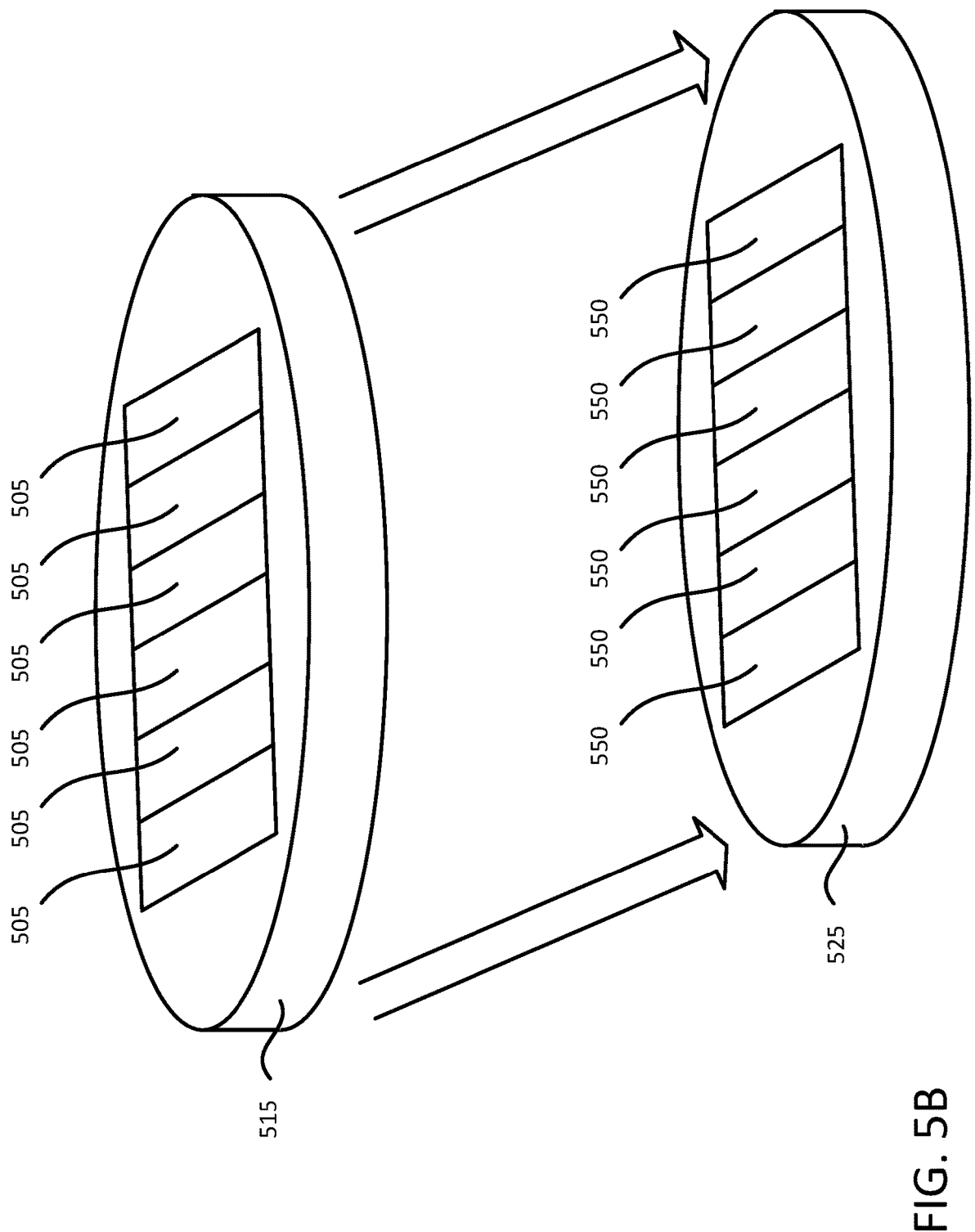
FIG. 5B illustrates an isometric view of a wafer-level assembly of several optical assemblies, such as the optical assembly shown in the cross-sectional view in FIG. 5A, according to embodiments of the present disclosure.

In some embodiments, such as in FIG. 5B, the first optical component 510 and the second optical component 520 (as indicated in FIG. 5A) are bonded together by the epoxy 570 to form a Photonic Integrated Circuit (PIC) 505 of known dimensions which is then later bonded to the shared platform 550. For example, a fabricator may construct the first optical component 510 and the second optical component 520 using different processes and combine several instances of the optical components together on a reconstituted wafer 515 into several dies of the PIC 505. The epoxy 570 may thereby act as a mold compound, to hold several PICs 505 together for wafer-level assembly with an electrical wafer 525 defining a corresponding number of dies for the shared platform 550 that are arranged for pairing with the dies of the PICs 505 on the reconstituted wafer 515. A fabricator may thereby align and bond (e.g., via solder bond) several PICs 505 to several shared platforms 550 of EICs at one time. After bonding the dies together, the fabricator may perform wafer-level tests on all or some of the combined dies, and dice the bonded wafers into individual optical assemblies that include instances of the first optical component 510, second optical component 520, and the shared platform 550 (e.g., as illustrated in FIGS. 5A and 5C).

The stabilizer 560 is an optional component that a fabricator may include between the first optical component 510 and the shared platform 550, which is made of a stress relief material that is dispensed to improve stability of the light path 540, by aligning the components of the optical assembly relative to the shared platform 550. In various embodiments, the stabilizer 560 provides a vertical reference that aligns the optical channels of the optical components in preparation for bonding. In some embodiments that include a stabilizer 560, the stabilizer 560 is positioned on the shared platform 550 before the epoxy bond is formed, while in other embodiments, the stabilizer 560 is dispensed or inserted between the shared platform 550 and the first optical component 510 after the epoxy bond between the first optical component 510 and the second optical component 520 are formed. In various embodiments, a soft epoxy (i.e., an epoxy that is more readily deformed than a 'hard' epoxy or the materials used in the shared platform 550 and/or the optical components) is used for the stabilizer 560 to reduce the forces or strains placed on the shared platform 550 and/or optical components when dried. The stabilizer 560 is added after the optical components are bonded with the shared platform 550, and may be dispensed in a cavity defined therebetween.

Figure 5C:
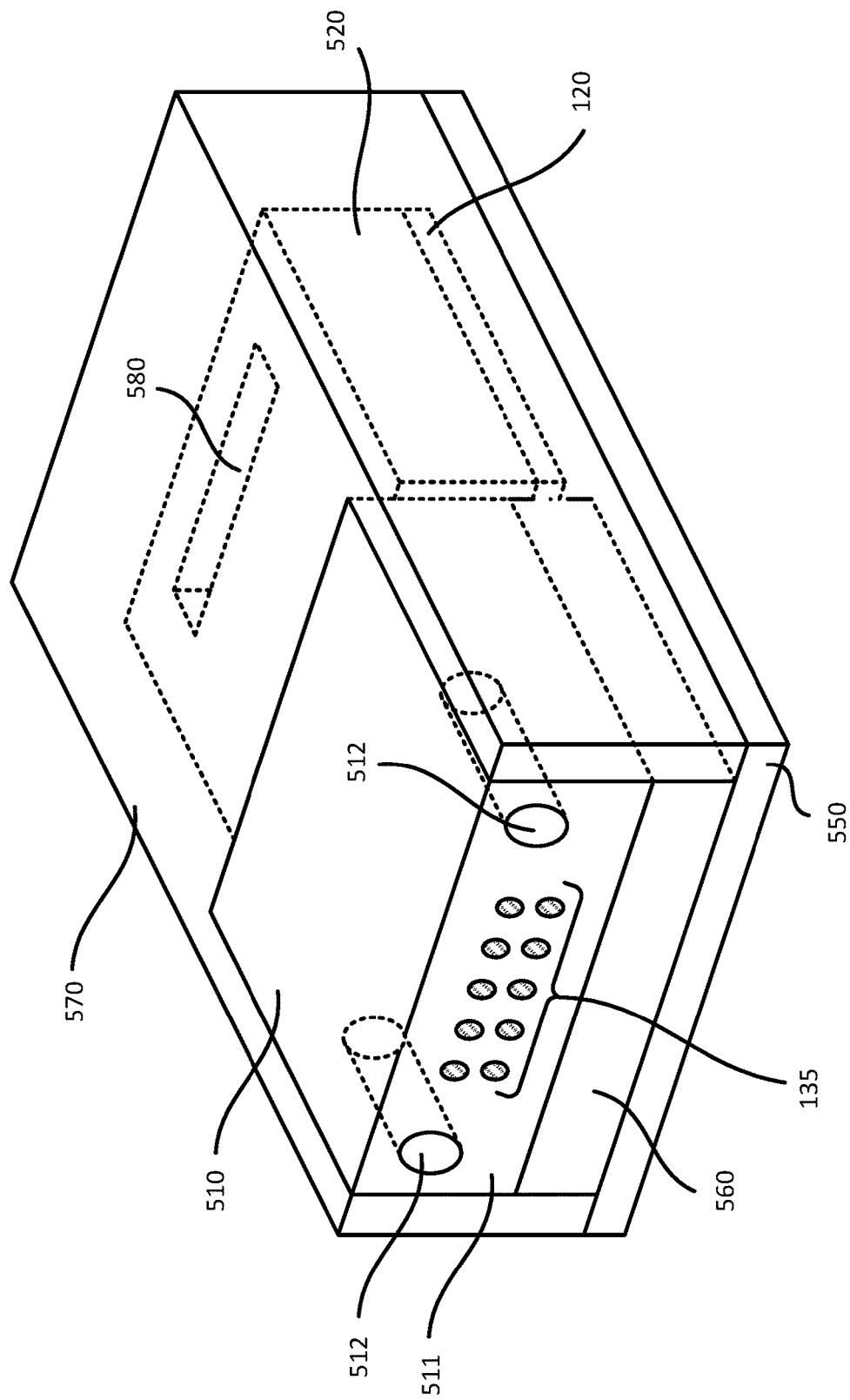
FIG. 5C illustrates an isometric view of an optical assembly, such as the optical assembly shown in the cross-sectional view in FIG. 5A, according to embodiments of the present disclosure.

The first optical component 510 and the second optical component 520 are arranged relative to one another in FIGS. 5A and 5C so that the first optical component 510 and the second optical component 520 are side-by-side or non-overlapping; there is no overhang or overlap of the optical components as in FIG. 2A-2B, 3A-3B, or 4A-4B. Accordingly, a fabricator may use optical components made of less material and that require fewer dimensions to tolerance when constructing a side-by-side arrangement of optical components than an overlapping arrangement of optical components, and will use different alignment techniques for the optical components to ensure the dimensions of the gap 530 and desired alignment of the light path 540. As used herein, a "side-by-side" arrangement indicates that a plane may be defined between the two components (e.g., in the gap 530) that intersects neither of the components described as being "side-by-side".

In various embodiments, the gap 530 defined between the first optical component 510 and the second optical component 520 is defined by one or more horizontal spacers 590 that position the first optical component 510 at a predefined distance from the second optical component 520. The horizontal spacers 590 provide a horizontal reference to define the gap 530, and may also include various features to interlock or provide for bonding between the optical components. In various embodiments, the horizontal spacers 590 may include various alignment features, such as those described in greater detail in regard to FIGS. 6A-6C and 7A-7C. In various embodiments, one or both of the first optical component 510 and the second optical component 520 may include horizontal spacers 590 to engage with the opposite optical component, or the horizontal spacers 590 may be a separate component (e.g., a glass block) placed between first optical component 510 and the second optical component 520.

The epoxy bond uses a high-temperature index matched epoxy 570 (generally, epoxy 570) so that the epoxy 570 does not melt, deform, or denature (e.g., alter the adhesive, protective, or light transmission properties thereof) during the soldering process. Other reflow compatible epoxies that are stable at temperatures and retain the bond between optical components of at least 260 degrees Celsius for at least five minutes may also be used.

In FIG. 5A, the epoxy 570 occupies a portion of the gap 530 between the optical fiber 135 of the first optical component 510 and the waveguides 130 of the second optical component 520, although various prong couplers 100 and optical fiber cable assemblies 105 may be used in various embodiments. Because the epoxy 570 is index matched to the material of the optical components, signals carried over the light path 540 travel through the gap 530 (via the epoxy 570) as though through the material of the optical components. In various embodiments, the surfaces of the first optical component 510 and the second optical component 520 may be treated with various mechanical processes or chemical process (e.g., smoothing, anti-reflective coatings) to further aid transmission of light from one optical component to another. In some embodiments, the second optical component 520 defines an etched trench 580 that a fabricator may define to various depths, and to run various lengths (e.g., into or out of the page) to provide for additional mechanical support when the epoxy 570 if deposited therein.

FIG. 5C illustrates an isometric view of an optical assembly, such as the optical assembly shown in the cross-sectional view 500 in FIG. 5A, according to embodiments of the present disclosure. The epoxy 570 bonds the first optical component 510 to the second optical component 520.

In various embodiments, depending how a fabricator dices a wafer containing the optical assembly or finalizes the optical assembly, the epoxy 570 may define planar surfaces or curved surfaces that expose various facets of the first optical component 510, the second optical component 520, or other components of the optical assembly. For example, the first optical component 510 may have at least a first facet 511 exposed from the epoxy 570 so that various optical fibers 135 (or waveguides 130) may be mated to an external device, and so that various mating features 512 (e.g., male and/or female connectors) are provided to secure the external device to the optical assembly.

As is shown in FIG. 5C, the epoxy 570 encapsulates the second optical component 520 with no facets thereof exposed. Instead, the fabricator may form various electrical traces through the shared platform 550, the substrate 120, and the second optical component 520 to interface with various electrical devices (e.g., photodetectors, lasers, signal modulators) defined in the second optical component 520.

As will be appreciated, because FIGS. 2A-2B, 3A-3B, 4A-4B, and 5A are cross-sectional in nature, FIGS. 2A-2B, 3A-3B, 4A-4B, and 5A may illustrate different views of the same optical assembly, or views of different optical assemblies. Additionally, because FIGS. 2A-2B, 3A-3B, 4A-4B, and 5A illustrate one coupling, and a single optical assembly may include more than one coupling, one or more of the joints described in FIGS. 2A-2B, 3A-3B, 4A-4B, and 5A may be included in a single optical assembly.

Although illustrated as cross-section views of optical devices, in various embodiments, the optical assemblies illustrated in FIGS. 2A-2B, 3A-3B, 4A-4B, and 5A may include active optical components (e.g., lasers, photodiodes, etc.) and electrical traces may formed within the material matrix relative to the waveguides 130 to form an active PIC or may omit active components to a POD. The optional active components are therefore not illustrated in FIGS. 2A-2B, 3A-3B, 4A-4B, and 5A so as to not distract from the interaction of the optical components described herein.

Figure 6A:
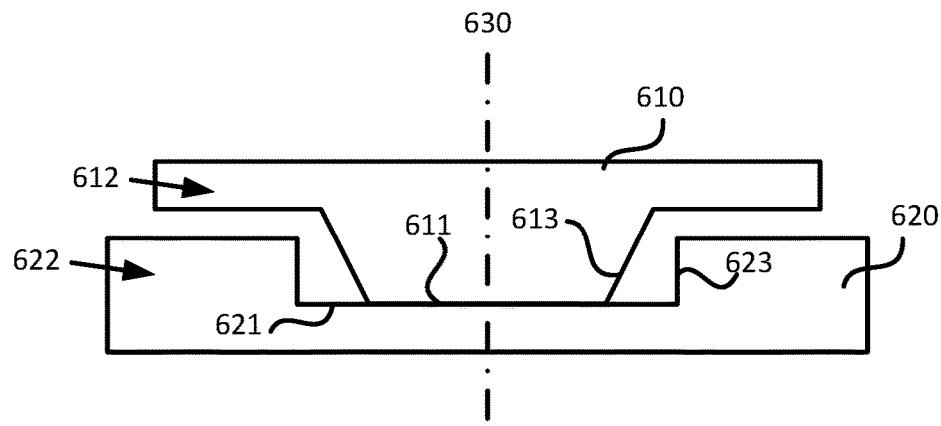
FIGS. 6A-6C illustrate various alignment protrusions mated with respective alignment receivers, according to embodiments of the present disclosure.
Figure 6B:
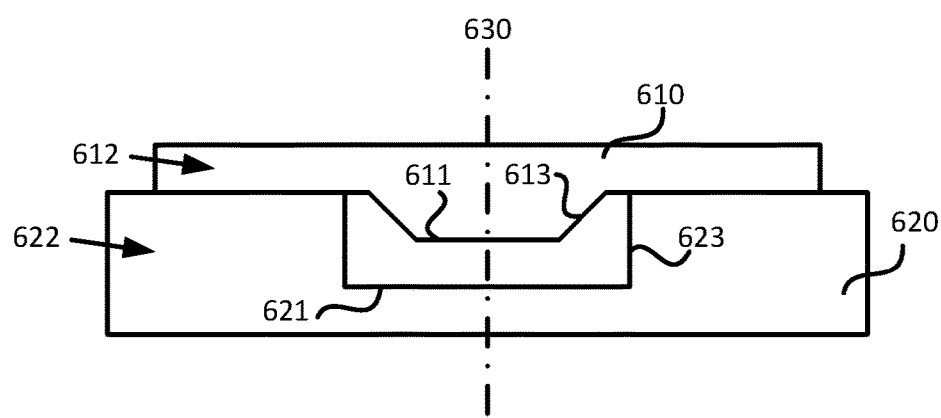
Figure 6C:
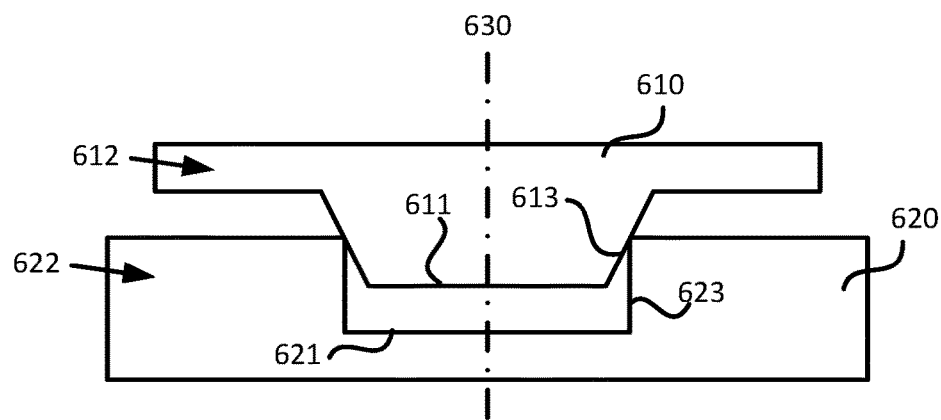

FIGS. 6A-6C illustrate various alignment protrusions 610 mated with respective alignment receivers 620, according to embodiments of the present disclosure. FIGS. 6A-6C illustrate cross sections of the alignment protrusion 610 and the alignment receiver 620, with different relative sizes between the alignment protrusions 610 and the alignment receivers 620, where each of the alignment protrusions 610 are aligned on a center line 630 of the alignment receiver 620. As FIGS. 6A-6C are cross sectional views, the protrusion 610 and receiver 620 may form a rectangular frustum and a trench, a circular insert and cavity, or various other shaped alignment features. Moreover, as discussed in greater detail in regard to FIGS. 7A-7C, the alignment protrusion 610 includes self-correcting alignment features 613 (e.g., the slanted sides of the protrusion 610) which contact sides 623 of the alignment receiver 620 for correcting the alignment of the components incorporating the alignment protrusion 610 and the alignment receiver 620.

In various embodiments, the protrusion 610 and the receiver 620 may be secured together via an epoxy or a solder applied between the components that incorporate the protrusion 610 (e.g., a first optical component) and the receiver 620 (e.g., a second optical component). In various embodiments, the epoxy may include the epoxy used to fill a gap between a first optical component and the second optical component that is both index matched and temperature resistant.

FIG. 6A illustrates the alignment protrusion 610 aligned with a middle of the alignment receiver 620 where the alignment protrusion 610 contacts a bottom surface 621 of the alignment receiver 620. In this example, a bottom surface 611 of the alignment protrusion 610 contacts the bottom surface 621 of the alignment receiver 620 and the shoulder 622 of the alignment receiver 620 does not contact the shoulder 612 of the alignment protrusion.

FIG. 6B illustrates that a fabricator may control the thickness of the protrusion 610 and/or the depth of the receiver 620 such that the bottom surface 611 of the protrusion 610 does not contact the bottom surface 621 of the receiver 620. Instead, a shoulder 612 of the protrusion 610 (e.g., the surface of the component from which the alignment protrusion 610 protrudes) contacts the shoulder 622 of the receiver 620 (e.g., a surface of the component in which the receiver 620 is defined).

FIG. 6C illustrates that a fabricator may control the relative sizes of the protrusion 610 and the receiver 620 such that the self-correcting alignment features 613 engage with the contact sides 623 so that the bottom surface 611 does not contact the bottom surface 621 and the shoulder 622 does not contact the shoulder 622.

Figure 7A:
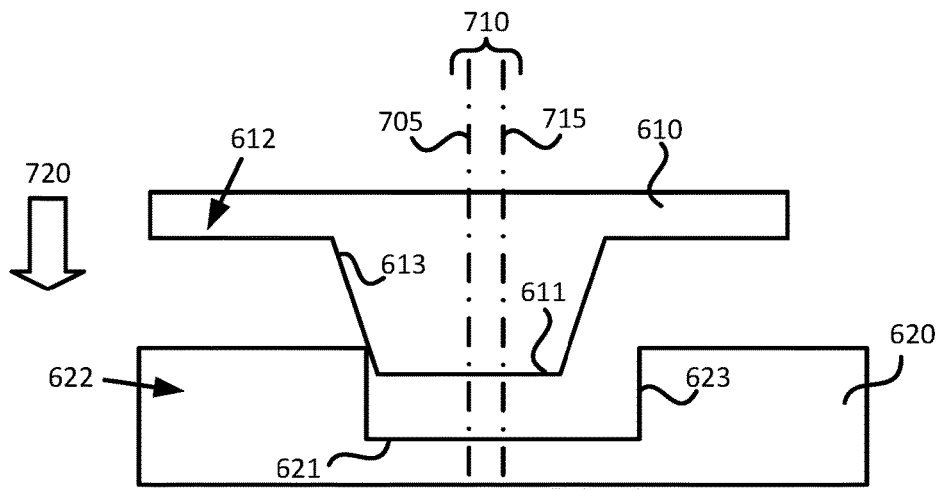
FIGS. 7A-7C illustrate mating a misaligned alignment protrusion with an alignment receiver, according to embodiments of the present disclosure.
Figure 7B:
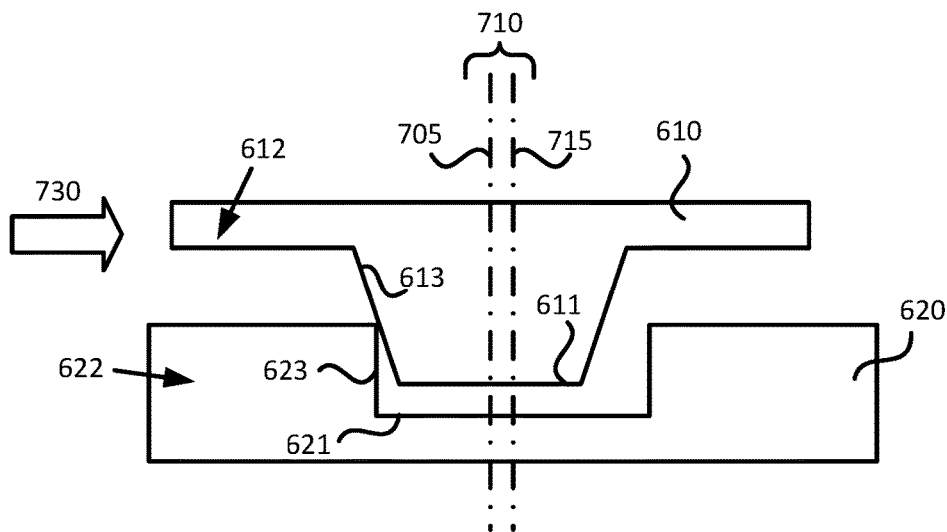
Figure 7C:
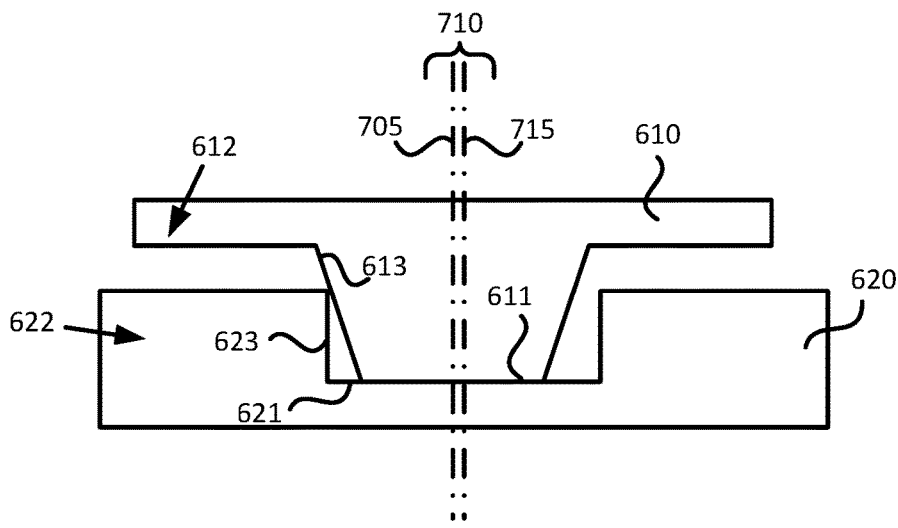

FIGS. 7A-7C illustrate mating a misaligned alignment protrusion 610 with an alignment receiver 620, according to embodiments of the present disclosure. FIG. 7A illustrates a scenario where the middle of the alignment protrusion 610 is offset 705 from the desired target location 715. The difference between the offset 705 and the target location 715 is illustrated as a misalignment 710. Stated differently, the misalignment 710 is the distance between respective middles of the alignment protrusion 610 and the alignment receiver 620.

The extent of the misalignment 710 can be based on the tolerances corresponding to the bonding machine or apparatus (e.g., a die bonder) used to place the components. For example, the die bonder may guarantee that the middle of the alignment protrusion 610 (e.g., the offset 705) is within +/−10 microns from the middle of the alignment receiver 620 (e.g., the desired target location 715). FIG. 7A illustrates a worst case scenario where the misalignment 710 is the maximum tolerance of the bonding machine.

To compensate for the tolerance or accuracy of the bonding machine, the alignment protrusion 610 is designed such that regardless of the misalignment 710, the self-correcting alignment feature 613 contacts a side 623 of the alignment receiver 620. That is, the width (W) of the alignment protrusion 610 can be controlled such that the flat, bottom surface 611 of the protrusion 610 falls within the receiver 620, and as a result, at least one of the self-correcting alignment features 613 contacts one of the sides 623.

The accuracy of the alignment may depend on the amount of control of the flatness of the bottom surface 611 on the protrusion 610 and the tolerance on the etch depth of the receiver 620 (which can be around +/−0.5 microns for many dielectrics). Moreover, the slope of the self-correcting alignment features 613 can be tightly controlled using an orientation dependent etch such as a KOH etch and the like.

In FIG. 7A, when the die bonder moves protrusion 610 in the vertical direction illustrated by the arrow 720, the bottom surface 611 is between the sides 623 of the receiver 620. Thus, even at maximum misalignment 710, the bottom surface 611 is within the receiver 620.

As the protrusion 610 continues to move in the direction shown by the arrow 720, the self-correcting alignment feature 613 contacts the side 623 which is illustrated in FIG. 7B. The die bonder continues to apply downward pressure but the resulting contact between the feature 613 and the side 623 creates a horizontal motion as shown by the arrow 730 which moves the middle of the alignment protrusion 610 closer to the middle of the alignment receiver 620. That is, in one embodiment, the die bonder does not apply the horizontal motion directly (e.g., the die bonder may apply pressure in the vertical direction) for the protrusion 610 to move horizontally relative to the receiver 620 to correct for the misalignment 710. The vertical pressure applied by the die bonder is converted into the horizontal motion illustrated by the arrow 720 to align the piece parts.

FIG. 7C illustrates when the die bonder has moved the parts until the bottom surface 621 of the protrusion 610 contacts the bottom surface 621 of the alignment receiver 620. The middles of the alignment protrusion 610 and the alignment receivers 620 may both be aligned at the target location 715, although there may be some remaining misalignment 710 due to the tolerances of the fabrication steps using to form the protrusion 610 and the receivers 620. However, the tolerances for processing the protrusions 610 and the receivers 620 may be much smaller or tighter than the tolerances for the die bonder—e.g., within +/−300 nanometers. For example, the alignment protrusions 610 may be formed from silicon or a molded material with very tight fabrication tolerances. Similarly, the techniques for etching the alignment receiver 620 can have much tighter tolerances than the die bonder.

Figure 8:
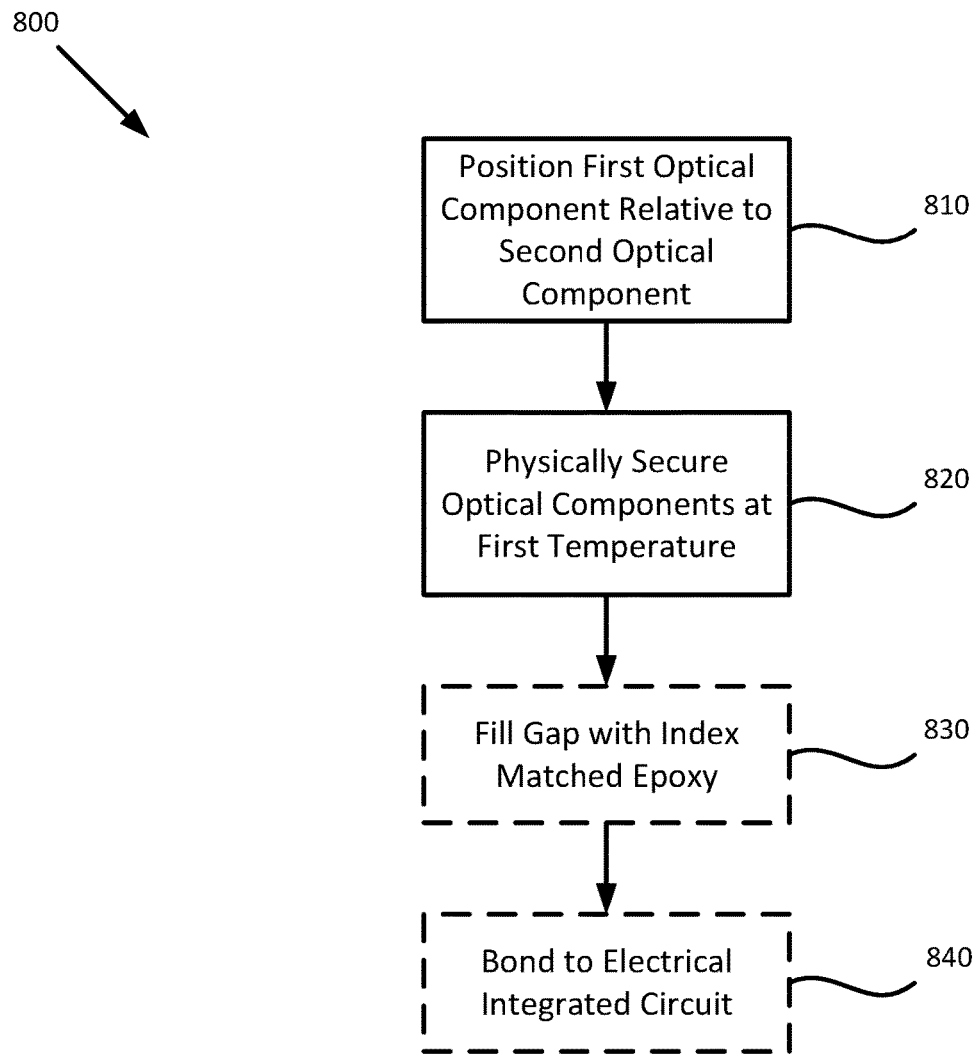
FIG. 8 is a flowchart of a method for fabricating an optical assembly with solder reflow compatible connectors, according to embodiments of the present disclosure.

FIG. 8 is a flowchart of a method 800 for fabricating an optical assembly with solder reflow compatible connectors, according to embodiments of the present disclosure. Method 800 begins at block 810, where a fabricator positions a first optical component relative to a second component to define a light path passing between the two optical components that includes a portion traversing a gap defined between the first and second optical components. In various embodiments, the two optical components may be aligned using various self-alignment features as described in FIGS. 6A-6C and 7A-7C to ensure that a first optical channel in the first optical component is properly aligned with a second optical channel in the second optical component. In various embodiments, the fabricator can position the first optical component relative to the second optical component to form one of an evanescent joint (e.g., as in FIGS. 2A and 2B), an abutting joint (e.g., as in FIGS. 3A-3B and 5A), or an open joint (e.g., as in FIGS. 4A and 4B).

In some embodiments, one or both of the first and second optical components include a spacer to provide a vertical or a horizontal reference surface to maintain a distance between the first and second optical components to define the gap. In some embodiments, a separate component used as a spacer is placed in contact with and between the first and second optical components to define a distance of the gap between the two optical components. In various embodiments, the spacer provides a vertical reference surface or a horizontal reference surface to define the gap. Additionally, the presence of one or more spacers between the optical components may provide additional physical support for the gap in the optical assembly.

At block 820 the fabricator physically secures the first optical component with the second optical component at a first temperature for a first amount of time. In various embodiments, the fabricator secures the optical components together via one or more solder bonds (e.g., a first temperature of at least 260 degrees Celsius for at least five minutes) and leaves the gap to be filled later with an epoxy (e.g., as in FIGS. 2A and 3A) or as an air gap to remain unfilled by an epoxy (e.g., as in FIGS. 2A and 4B). In some embodiments, the fabricator omits solder bonds, and secures the optical components together using an index matched epoxy disposed in the gap between the optical components (e.g., as in FIGS. 2B, 3B, and 5A). The epoxy used to form the epoxy bonds is reflow compatible, and thus bonds the optical components together such that the components can stay bonded together without disrupting the light path even if a later solder bond is formed.

At block 830 a fabricator optionally fills the gap with an index matched epoxy. For example, a fabricator may form one or more solder joints between the optical components (e.g., as in block 820) and then partially fills the gap defined between the optical components at least where the optical channels at located so that the light path running between the optical channels travels through the epoxy. In various embodiments, the index matched epoxy applied in optional block 830 is reflow compatible so that the fabricator may perform a later solder reflow process with the epoxy in place without risk of the temperatures used during solder reflow negatively affecting the optical, protective, or adhesive properties of the epoxy or otherwise disrupting the light path.

At block 840 a fabricator optionally bonds the optical assembly to an EIC. Because the epoxies (if used) are reflow compatible, the fabricator may use a high-temperature solder reflow process to bond the optical assembly to the EIC. For example, a solder pads defined on an exposed surface of the first optical component or the second optical component (or a substrate portion thereof) may be aligned with solder pads on the EIC and/or solder beads to physically and/or electrically connect the optical components with the EIC.

Method 800 may then conclude.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:
1. A device, comprising:
 a first optical component that includes a first optical channel defined at a first height relative to a reference plane and that terminates at a first interface surface of the first optical component, the reference plane is perpendicular to a vertical direction; and
 a second optical component that includes a second optical channel defined at a second height, different from the first height, relative to the reference plane and that terminates at a second interface surface of the second optical component;
 wherein an air gap is defined between the first interface surface and the second interface surface, the first interface surface and the second interface surface are sloped relative to the reference plane;
 wherein a light path is defined between the first optical channel and the second optical channel across at least a portion of the air gap and aligned between the first optical channel and the second optical channel according to a refractive difference of the air present in the air gap; and
 wherein the first optical component is bonded, via a solder bond, to the second optical component.
2. The device of claim 1, wherein a portion of the light path is filled with a reflow compatible epoxy configured to remain bonded to the first optical component and the second optical component and remain index matched to the first optical channel and the second optical channel at temperatures of at least 260 degrees Celsius for at least five minutes.

3. The device of claim 2 further comprising:
a shared platform of an electrical integrated circuit physically connected to the first optical component and to the second optical component and electrically connected to the second optical component.

4. The device of claim 1, wherein the second optical channel is a photonic waveguide and the first optical channel is an optical fiber.

5. The device of claim 1, wherein the first interface surface and the second interface surface share a slope that is one of acute or obtuse relative to the reference plane.

6. The device of claim 1, further comprising:
a spacer connected to the first optical component and the second optical component to define a vertical reference between the first optical component and the second optical component.

7. A device, comprising:
a first optical component that includes a first optical channel; and
a second optical component that includes a second optical channel aligned with the first optical channel to define a light path running between the first optical component and the second optical component, wherein an air gap is defined between the first optical component and the second optical component through which the light path travels; and
a shared platform of an Electrical Integrated Circuit physically secured to and electrically connected with the second optical component via a solder bond, and
wherein the first optical channel and the second optical channel are arranged at different heights, but are aligned in part, along a vertical direction.

8. The device of claim 7, further comprising:
a spacer disposed in the air gap and in contact with the first optical component and the second optical component, wherein a dimension of the spacer in a first direction at least partially defines a size of the air gap in the first direction.

9. The device of claim 7, further comprising:
a stabilizer disposed between the shared platform and the first optical component.

10. The device of claim 7, wherein the first optical channel comprises an optical fiber and the second optical channel comprises a photonic waveguide.

11. The device of claim 7, wherein the first optical component and the second optical component are arranged side-by-side without overhang between the first optical component and the second optical component.

12. A method, comprising:
positioning a first optical component relative to a second optical component to define an air gap between a first optical channel included in the first optical component and a second optical channel included in the second optical component;
securing the first optical component to the second optical component via a solder bond; and
applying a reflow compatible epoxy in at least a portion of the air gap between the first optical channel and the second optical channel, wherein the reflow compatible epoxy is configured to remain bonded between the first optical component and the second optical component at temperatures of at least 260 degrees Celsius; and
wherein securing the first optical component to the second optical component comprises, after applying the reflow compatible epoxy, physically securing the first optical component and the second optical component to a shared platform via a solder bond.

13. The method of claim 12, wherein securing the first optical component to the second optical component comprises:
before applying the reflow compatible epoxy, physically securing the first optical component to the second optical component via the solder bond.

14. The method of claim 12, wherein applying the reflow compatible epoxy encapsulates the first optical component and the second optical component as one die of a plurality of dies for a photonic integrated circuit in a reconstituted wafer.

15. The method of claim 12, wherein the first optical channel is one of a first optical fiber and a first photonic waveguide, and the second optical channel is one of a second optical fiber and a second photonic waveguide.

16. The method of claim 12, wherein positioning the first optical component relative to the second optical component defines an evanescent joint between the first optical channel and the second optical channel.

17. The method of claim 12, wherein positioning the first optical component relative to the second optical component defines an abutting joint between the first optical channel and the second optical channel.

* * * * *